United States Patent
Zhang et al.

(10) Patent No.: US 9,860,529 B2
(45) Date of Patent: Jan. 2, 2018

(54) PROCESSING ILLUMINATION COMPENSATION FOR VIDEO CODING

(71) Applicant: QUALCOMM Incorporated, San Diego, CA (US)

(72) Inventors: Li Zhang, San Diego, CA (US); Ying Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 684 days.

(21) Appl. No.: 14/332,105

(22) Filed: Jul. 15, 2014

(65) Prior Publication Data
US 2015/0023422 A1 Jan. 22, 2015

Related U.S. Application Data

(60) Provisional application No. 61/846,985, filed on Jul. 16, 2013.

(51) Int. Cl.
*H04N 19/14* (2014.01)
*H04N 19/583* (2014.01)
(Continued)

(52) U.S. Cl.
CPC ..... *H04N 19/00042* (2013.01); *H04N 19/105* (2014.11); *H04N 19/11* (2014.11);
(Continued)

(58) Field of Classification Search
CPC ........ H04N 19/51; H04N 19/14; H04N 19/11; H04N 19/70; H04N 19/00042
(Continued)

(56) References Cited

U.S. PATENT DOCUMENTS

2006/0067406 A1* 3/2006 Kitada ................. H04N 19/176
375/240.16
2009/0290643 A1* 11/2009 Yang .................... H04N 19/597
375/240.16
(Continued)

FOREIGN PATENT DOCUMENTS

WO WO 2008130716 A2 * 4/2008

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.
(Continued)

*Primary Examiner* — Tung Vo
*Assistant Examiner* — Zaihan Jiang
(74) *Attorney, Agent, or Firm* — Shumaker & Sieffert, P.A.

(57) ABSTRACT

In one example, a device for coding (e.g., encoding or decoding) video data includes a memory configured to store video data and a video coder configured to determine a value for an advanced residual prediction (ARP) weighting factor of a current block of the video data and to skip coding of an illumination compensation syntax element for the current block and to code the current block when the value of the ARP weighting factor is not equal to zero. The video coder may further be configured to code the illumination compensation syntax element for the current block and code the current block based at least in part on the value of the illumination compensation syntax element when the value of the ARP weighting factor is equal to zero.

29 Claims, 13 Drawing Sheets

(51) Int. Cl.

| | | |
|---|---|---|
| *H04N 19/51* | (2014.01) | |
| *H04N 19/11* | (2014.01) | |
| *H04N 19/597* | (2014.01) | |
| *H04N 19/105* | (2014.01) | |
| *H04N 19/159* | (2014.01) | |
| *H04N 19/70* | (2014.01) | |
| *H04N 19/174* | (2014.01) | |
| *H04N 19/513* | (2014.01) | |
| *H04N 19/182* | (2014.01) | |

(52) U.S. Cl.
 CPC .......... *H04N 19/14* (2014.11); *H04N 19/159* (2014.11); *H04N 19/174* (2014.11); *H04N 19/182* (2014.11); *H04N 19/51* (2014.11); *H04N 19/513* (2014.11); *H04N 19/597* (2014.11); *H04N 19/70* (2014.11)

(58) Field of Classification Search
 USPC ...................................................... 375/240.16
 See application file for complete search history.

(56) References Cited

U.S. PATENT DOCUMENTS

| | | | | |
|---|---|---|---|---|
| 2011/0044550 | A1* | 2/2011 | Tian ..................... | H04N 19/597 382/238 |
| 2014/0010305 | A1* | 1/2014 | Mironovich ..... | H04N 19/00763 375/240.16 |
| 2014/0314147 | A1* | 10/2014 | Rusanovskyy ...... | H04N 19/597 375/240.12 |
| 2014/0341292 | A1* | 11/2014 | Schwarz ............. | H04N 19/597 375/240.16 |
| 2014/0376633 | A1 | 12/2014 | Zhang et al. | |

OTHER PUBLICATIONS

Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Oct. 4, 2011, 226 pp.
Bross et al., "WD5: Working Draft 5 of High-Efficiency Video Coding," 7th Meeting: Geneva, Switzerland, Dec. 30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 9, 2012, JCTVC-J1003_d7, 261 pp.
Bross et al., "High efficiency video coding (HEVC) text specification draft 9," 11th Meeting: Shanghai, CN, Nov. 2, 2012, JCTVC-K1003_v7, 290 pp.
Bross et al., "High efficiency video coding (HEVC) text specification draft 10 (For FDIS & Last Call)," 12th Meeting: Geneva, CH, Mar. 19, 2013, JCTVC-L1003_v34, 310 pp.
Itu-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Itu-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
Itu-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
Itu-T H.265, Series H: Audiovisual and Multimedia Systems, Infrastructure of audiovisual services—Coding of moving ride°, Advanced video coding for generic audiovisual services, The International Telecommunication Union. Apr. 2015, 634 pp.
Ikai, "3D-CE5.h related: Removal of parsing dependency for illumination compensation", JCT-3V Meeting; Apr. 20-26, 2013; Incheon; (The Joint Collaborative Team on 3D Video Coding Extension Development of ISO/IEC JTC1/SC29/WG11 and ITU-T SG~16 ); URL: http://phenix.int-evry.fr/jct2/,, No. JCT3V-D0060, XP030130724, 4 pp.
Liu, et al., "3D-CE2.h: Results of Illumination Compensation for Inter-View Prediction", JCT-3V Meeting; MPEG Meeting; Oct. 13-19, 2012; Shanghai; (The Joint Collaborative Team on 3D Video Coding Extension Development of ISO/IEC JTC1/SC29/WG11 and ITU-T SG.16); URL: http://phenix.int-evry.fr/jct2/,, No. JCT3V-B0045, XP030130226, 5 pp.
Zhang, et al., "3D-CE4: Advanced residual prediction for multiview coding," Joint Collaborative Team on 3D Video eroding Extension Development of ITU-T SG 16 WP 3 and ISO/IEC JTC 1/SC 29/WG 11, JCT3V-00049, 3rd Meeting: Geneva, CH, Jan. 17-23, 2013, 5 pp.
Zhang, et al., "CE4: Advanced residual prediction for multiview coding", JCT-3V Meeting; Apr. 20-26, 2013; Incheon; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-D0177, XP030130841, 10 pp.
Kang, et al., "CE4.h related: Coding of illumination compensation flag", JCT-3V Meeting; Jul. 27,-Aug. 2, 2013; Vienna; (The Joint Collaborative Team on 3D Video Coding Extension Development of ISO/IEC JTC1/SC29/WG11 and ITU-T SG.16); URL: http://phenix.int-evry.fr/jct2/, No. JCT3V-E0135, XP030131154, 9 pp.
Ohm, et al., "Meeting Report of 5th JCT-3V Meeting", JCT-3V Meeting; Jul. 27,-Aug. 2, 2015; Vienna; (The Joint Collaborative Team on 3D Video Coding Extension Development of ISO/IEC JTC1/SC29/WG11 and ITU-T SG.16); URL: http://phenix.int-evry.fr/jct2/,, No. JCT3V-E1000, XP030131376, 142 pp.
Park, et al., "3D-CE4: Results on Simplification of Residual Prediction", JCT-3V Meeting; Oct. 25,-Nov. 1, 2013; Geneva; (The Joint Collaborative Team on 3D Video Coding Extension Development of ISO/IEC JTC1/SC29/WG11 and ITU-T SG.16); URL: http://phenix.int-evry.fr/jct2/, No. JCT3V-F0145, XP030131577, 4 pp.
Tech, et al., "3D-HEVC Test Model 4", JCT-3V Meeting; Apr. 20-26, 2013; Incheon; (The Joint Collaborative Team on 3D Video Coding Extension Development of ISO/IEC JTC1/SC29/WG11 and ITU-T SG.16); URL: http://phenix.int-evry.fr/jct2/, No. JCT3V-D1005, XP030130983, 52 pp.
Tech, et al., "3D-HEVC Test Model 4 (version 4)", revised Jun. 24, 2013, XP055144713, (The Joint Collaborative Team on 3D Video Coding Extension Development of ISO/IEC JTC1/SC29/WG11 and ITU-T SG.16); URL: http://phenix.int-evry.fr/jct2/, Document: JCT3V-D1005-spec-v4, 90 pp.
Zhang, et al., "CE4: Further improvements on advanced residual prediction", JCT-3V Meeting; Oct. 25,-Nov. 1, 2013, Geneva; (The Joint Collaborative Team on 3D Video Coding Extension Development of ISO/IEC JTC1/SC29/WG11 and ITU-T SG.16 ), No. JCT3V-F0123, XP030131548, 6 pp.
U.S. Appl. No. 61/842,834, filed Jul. 3, 2013, by Kang et al.
International Search Report and Written Opinion from International Application No. PCT/US2014/046874, dated Oct. 29, 2014, 11 pp.
Response to Written Opinion dated Oct. 29, 2014 from International Application No. PCT/US2014/046874, Filed on May 15, 2015, 5 pp.
Second Written Opinion from International Application No. PCT/US2014/046874, filed on Jul. 8, 2015, 8 pp.

(56) References Cited

OTHER PUBLICATIONS

Response to Second Written Opinion dated Jul. 8, 2015, from International Application No. PCT/US2014/046874, Filed on Sep. 8, 2015, 5 pp.
International Preliminary Report on Patentability from International Application No. PCT/US2014/046874, dated Oct. 23, 2015, 10 pp.

* cited by examiner

PROCESSING ILLUMINATION COMPENSATION FOR VIDEO CODING

This application claims the benefit of U.S. Provisional Application No. 61/846,985, filed Jul. 16, 2013, the entire contents of which are hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to coding (e.g., signaling and receiving a signal indicative of) a prediction mode for a current block of video data. An inter-predicted block may be predicted using temporal inter-prediction, inter-view prediction, advanced residual prediction, or illumination compensation. However, illumination compensation and advanced residual prediction are not used together. Therefore, this disclosure proposes that a syntax element (e.g., a flag) that indicates whether illumination compensation is used for the current block is not signaled when an advanced residual prediction weighting factor has a non-zero value, which effectively indicates that advanced residual prediction is used for the current block.

In one example, a method of decoding video data includes determining a value for an advanced residual prediction (ARP) weighting factor of a current block and when the value of the ARP weighting factor is not equal to zero, skipping decoding of an illumination compensation syntax element for the current block, and decoding the current block. The method may further include, when the value of the ARP weighting factor is equal to zero, decoding an illumination compensation syntax element for the current block and decoding the current block based at least in part on the value of the illumination compensation syntax element.

In another example, a method of encoding video data includes determining a value for an advanced residual prediction (ARP) weighting factor of a current block and when the value of the ARP weighting factor is not equal to zero, skipping encoding of an illumination compensation syntax element for the current block, and encoding the current block. The method may further include, when the value of the ARP weighting factor is equal to zero, encoding the illumination compensation syntax element for the current block and encoding the current block based at least in part on the value of the illumination compensation syntax element.

In another example, a device for coding (e.g., encoding or decoding) video data includes a memory configured to store video data and a video coder configured to determine a value for an advanced residual prediction (ARP) weighting factor of a current block of the video data and to skip coding of an illumination compensation syntax element for the current block and to code the current block when the value of the ARP weighting factor is not equal to zero. The video coder may further be configured to code the illumination compensation syntax element for the current block and code the current block based at least in part on the value of the illumination compensation syntax element when the value of the ARP weighting factor is equal to zero.

In another example, a device for coding video data includes means for determining a value for an advanced residual prediction (ARP) weighting factor of a current block, means for skipping coding of an illumination compensation syntax element for the current block when the value of the ARP weighting factor is not equal to zero, and means for coding the current block when the value of the ARP weighting factor is not equal to zero. The device may further include means for coding the illumination compensation syntax element for the current block when the value of the ARP weighting factor is equal to zero and means for coding the current block based at least in part on the value of the illumination compensation syntax element when the value of the ARP weighting factor is equal to zero.

In another example, a computer-readable storage medium (e.g., a non-transitory computer-readable storage medium) has stored thereon instructions that, when executed, cause a processor of a device for coding video data to determine a value for an advanced residual prediction (ARP) weighting factor of a current block and when the value of the ARP weighting factor is not equal to zero, skip coding of the illumination compensation syntax element for the current block, and code the current block. The computer-readable storage medium may further include instructions that cause the processor to, when the value of the ARP weighting factor is equal to zero, code an illumination compensation syntax element for the current block and code the current block based at least in part on the value of the illumination compensation syntax element.

The details of one or more examples are set forth in the accompanying drawings and the description below. Other features, objects, and advantages will be apparent from the description and drawings, and from the claims.

DETAILED DESCRIPTION

Figure 1:
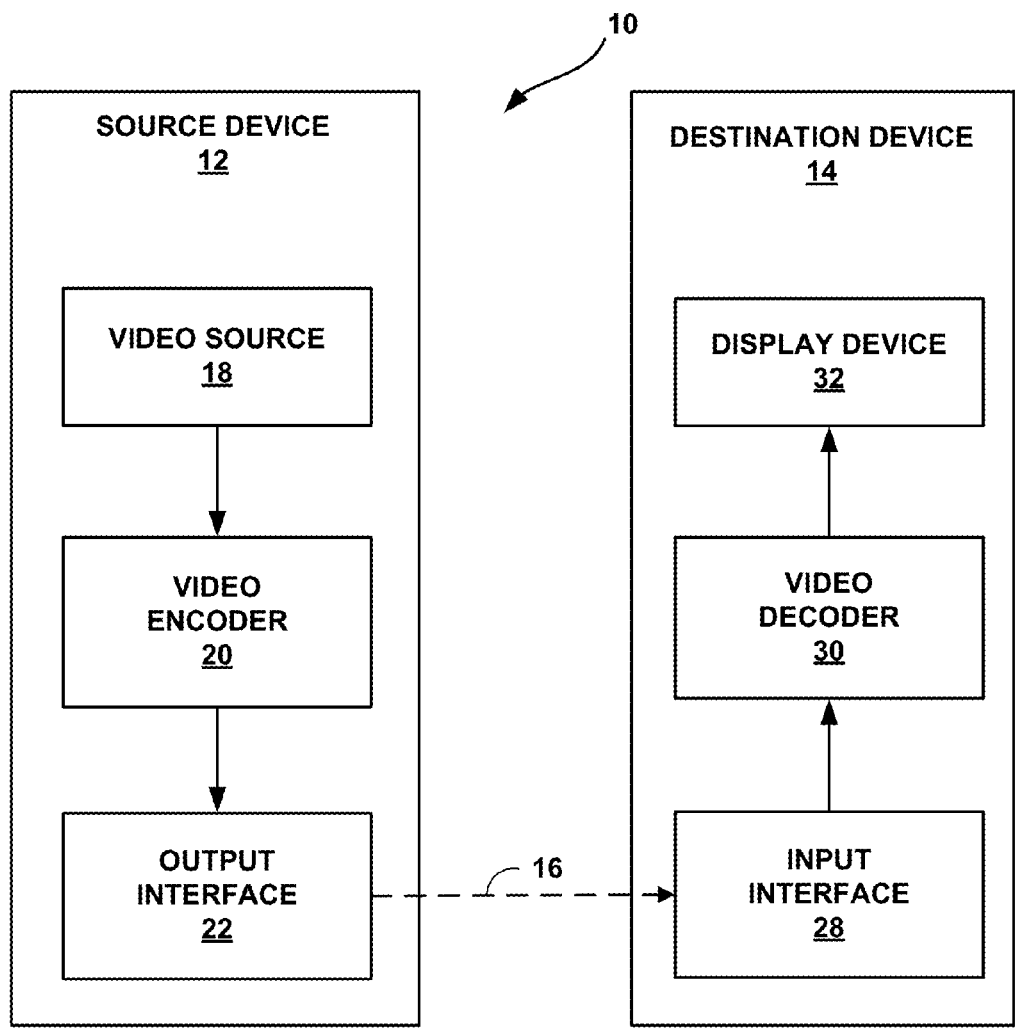
FIG. 1 is a block diagram illustrating an example video encoding and decoding system that may utilize techniques for signaling illumination compensation.

The techniques of this disclosure are generally related to multi-layer (e.g., multi-view) video coding based on advanced codecs, e.g., including the coding of two or more views with the 3D-HEVC (High Efficiency Video Coding) codec. For instance, this disclosure describes techniques related to the signaling of illumination compensation mode together with the signaling of advanced residual prediction mode.

In general, video coding (encoding or decoding) involves taking advantage of redundancies within individual pictures and between separate pictures of video data to compress a bitstream. For instance, intra-prediction, also referred to as spatial prediction, involves predicting a block of a picture using pixels of neighboring, previously coded blocks. Temporal inter-prediction involves predicting a block of a picture using a reference block of a previously coded picture. Inter-layer prediction involves predicting a block of a picture using data of a previously coded picture in a different layer, assuming that the bitstream includes multiple layers of video data. In the case of multi-view video data, distinct layers may correspond to different views, e.g., different horizontal locations for camera perspectives of a scene that may be used to produce a three-dimensional effect for a viewer.

Various inter-layer prediction techniques may be used to predict a block of video data. For example, a block of video data may be predicted using a disparity motion vector that identifies a reference block in an inter-layer reference picture. Illumination compensation is another technique that involves inter-view prediction. In general, illumination compensation involves manipulating pixel values of a reference block identified by a disparity motion vector using a linear equation whose parameters are determined based on neighboring samples (pixels) to the current block and neighboring samples to the reference block.

As yet another example, advanced residual prediction is a technique that utilizes both a disparity vector (or a disparity motion vector) and a temporal motion vector when predicting a current block. In general, the disparity vector identifies a block in a reference view, and the temporal motion vector is applied both to the current block to identify a reference block in the current view and to the block in the reference view to identify a second reference block in the reference view. Alternatively, the second reference block can be identified by applying the disparity vector to the first reference block. A video coder may apply a weighting factor to the difference between the second reference block and the block in the reference view, where the weighting factor may be a value of 0, 0.5, or 1, and then add this weighted value (pixel by pixel) to the first reference block to produce a predicted block for the current block. When the weighting factor is equal to 0, advanced residual prediction is not used to predict the current block, because all weighted values are assigned a value of 0. Both the first reference block and the second reference block, assuming that the weighting factor is not equal to zero, are used to calculate a predicted block for the current block.

As described in greater detail below, this disclosure generally describes techniques for signaling data related to prediction of a current block. For example, flags or other syntax elements may be coded for the current block that indicate whether the current block is predicted using, e.g., conventional inter-view prediction, advanced residual prediction, or illumination compensation. More particularly, this disclosure recognizes that illumination compensation would only be performed for a current block if advanced residual prediction is not used to predict the current block. In some examples, a flag indicating whether illumination compensation is to be performed for a current block is only coded (e.g., signaled) for the current block if a weighting factor for advanced residual prediction is equal to zero. In other words, in some examples, the flag indicating whether illumination compensation is to be performed for a current block is not coded (e.g., signaled) for the current block if the weighting factor for advanced residual prediction is not equal to zero.

As explained above, a weighting factor value equal to zero indicates that advanced residual prediction is not used, and hence, illumination compensation may be used to predict the current block in the case that the weighting factor value for advanced residual prediction is equal to zero. A non-zero value for the weighting factor value (e.g., values of 0.5 or 1.0) may indicate that the illumination compensation flag is not signaled (hence, not to be coded). Accordingly, a non-zero value for the weighting factor of advanced residual prediction may indicate that the illumination compensation flag is not present in the bitstream.

Thus, in accordance with the techniques of this disclosure, a video coder (e.g., a video encoder or a video decoder) may be configured to determine a value of a weighting factor of advanced residual prediction for a current block. If the weighting factor has a value of zero, a video encoder may determine to encode a value for an illumination compensation syntax element for the current block, such that the value of the illumination compensation syntax element indicates whether the video encoder determined to encode the current block using illumination compensation. That is, when the video encoder determines not to use ARP to predict a block being encoded (such that the ARP weighting factor has a value of zero), the video encoder may encode the illumination compensation syntax element. Similarly, a video decoder may determine that when the weighting factor for the current block has a value of zero, the illumination compensation syntax element will be signaled, and thus, may determine whether to use illumination compensation to predict the current block based on the illumination compensation syntax element. On the other hand, if the weighting factor has a non-zero value, a video encoder may skip encoding of the illumination compensation syntax element, such that the illumination compensation syntax element does not form part of the bitstream. That is, when the video encoder elects to predict a block being encoded using ARP (such that the ARP weighting factor has a non-zero value), the video encoder may skip encoding of the illumination compensation syntax element. Likewise, the video decoder may determine that when the weighting factor has a non-zero value, the illumination compensation syntax element will not be present in the bitstream for the current block and therefore infer (i.e., determine without receiving explicit signaling) that illumination compensation is not used to predict the current block.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The MVC extension of H.264 is described in "Advanced video coding for generic audiovisual services," ITU-T Recommendation H.264, March 2010.

In general, the 2D video coding (such as video encoding or video decoding) techniques include block-based coding techniques. Block-based coding includes predicting a block, whether by inter-prediction (also referred to as temporal prediction) or intra-prediction (also referred to as spatial prediction). In intra-prediction, a video coder (e.g., a video encoder or a video decoder) predicts a current block from neighboring, previously coded pixels (also referred to as "samples"). In inter-prediction, the video coder predicts the current block from a previously coded picture using one or more sets of motion parameters (which may include one or more respective motion vectors).

In HEVC, there are two modes for the prediction of motion parameters: one is merge mode and the other is advanced motion vector prediction (AMVP). In merge mode, a candidate list of motion parameters (prediction direction, reference pictures, and motion vectors) is constructed, where the candidate can be selected from spatial and temporal neighboring blocks. The video encoder may signal the selected motion parameters by transmitting an index into the candidate list. At the decoder side, once the index is decoded, all the motion parameters of the corresponding block where the index points to are inherited for the current block.

In AMVP, a candidate list of motion vector predictors for each motion hypothesis is derived based on the coded reference index. This list includes motion vectors of neighboring blocks that are associated with the same reference index as well as a temporal motion vector predictor which is derived based on the motion parameters of the neighboring block of the co-located block in a temporal reference picture. The selected motion vectors are signaled by transmitting an index into the candidate list. In addition, the reference index values and motion vector differences are also signalled. Motion data compression methods will be described in greater detail below.

Motion vectors may also be predicted using temporal motion vector prediction (TMVP). To obtain a temporal motion vector predictor for a motion vector of a current block, a video coder may first identify a co-located picture to a current picture including the current block. If the current picture is a B slice (i.e., a slice include bi-directionally predicted blocks), a collocated_from_l0_flag may be signalled in a slice header of a slice including the current block, to indicate whether the co-located picture is from RefPicList0 or RefPicList1. In addition, for a B slice, a combined list (RefPicListC) may be constructed after the final reference picture lists (RefPicList0 and RefPicList1) have been constructed. The combined list may further be modified if reference picture list modification syntax is present for the combined list.

After the video coder identifies a reference picture list, the video coder may use collocated_ref_idx—signalled in slice header—to identify the picture in the picture in the list. The video coder may then identify a co-located PU by checking the co-located picture. Either the motion of the bottom-right PU of the co-located PU, or the motion of the center PU of the co-located PU, is used as the predictor, for purposes of TMVP.

When a video coder uses motion vectors identified by the above process to generate a motion candidate for AMVP or merge mode, the video coder may scale the motion vector predictor of the motion candidate, based on the temporal location (reflected by a picture order count (POC) value).

In HEVC, a picture parameter set (PPS) includes the flag enable_temporal_mvp_flag. When a particular picture with temporal_id equal to 0 refers to a PPS having enable_temporal_mvp_flag equal to 0, all the reference pictures in the decoded picture buffer (DPB) are marked as "unused for temporal motion vector prediction," and no motion vector from pictures before that particular picture in decoding order would be used as a temporal motion vector predictor in decoding of the particular picture or a picture after the particular picture in decoding order.

The techniques of this disclosure are generally related to signaling illumination compensation mode in 3D-HEVC, although these techniques may be implemented in other video coding standards and/or extensions of other video coding standards. Illumination compensation mode in 3D-HEVC is described in greater detail below with respect to FIGS. 7-10. Illumination compensation mode in 3D-HEVC, prior to this disclosure, may have the following problems:

In the design of ARP, when a coding unit (CU) is coded with ARP (i.e., signaling an ARP weighting factor with a value not equal to 0), the presence of an illumination compensation (ic_flag) may be redundant, e.g., since the current CU may not be predicted by an inter-view reference picture.

ARP could be also applied to inter-view prediction, as in U.S. Provisional Applications 61/838,208, filed Jun. 21, 2013, and 61/846,036, filed Jul. 14, 2013. In this case, the relationship between ARP weighting factors and the ic_flag is not considered, and therefore, the ic_flag might be redundant when present.

The control of the usage of illumination compensation is in the slice level. Therefore, multiple bits may be wasted when a whole sequence does not use illumination compensation.

Furthermore, this disclosure recognizes that, generally, ARP and illumination compensation are not performed together (i.e., together on the same block). Thus, when ARP is performed (e.g., when an ARP weighting factor has a non-zero value), an illumination compensation syntax element need not be signaled. Likewise, when ARP is not performed (e.g., when the ARP weighting factor has a value of zero), the illumination compensation syntax element may be signaled.

Techniques in accordance with examples of this disclosure, when implemented, may overcome any or all of these problems when illumination compensation (IC) is applied in disparity motion compensation, and when considering whether ARP is applicable to a current block (e.g., a current CU). Each aspect of the techniques of this disclosure may be used in isolation or in combination with any other aspect.

FIG. 1 is a block diagram illustrating an example video encoding and decoding system 10 that may utilize techniques for signaling illumination compensation. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablets, televisions, cameras, display devices, digital media players, video gaming consoles, video streaming device, or the like. In some cases, source device 12 and destination device 14 may be equipped for wireless communication. Source device 12 and destination device 14 may include a memory to store video data, e.g., respective memories within video encoder 20 and video decoder 30 and/or memories external to video encoder 20 and video decoder 30, such as a coded picture buffer (CPB) and buffers to store raw, uncoded data (for source device 12) or decoded data (for destination device 14).

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for signaling illumination compensation. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for signaling illumination compensation may be performed by any digital video encoding and/or decoding device. Although generally the techniques of this disclosure are performed by a video encoding device or a video decoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard, and may conform to the HEVC Test Model (HM). Video encoder 20 and video decoder 30 may also operate according to one or more extensions to a video coding standard, such as scalable video coding and/or multiview video coding extensions, e.g., scalable HEVC (SHVC), three-dimensional HEVC (3D-HEVC), or multiview HEVC (MV-HEVC). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC has developed and continues to refine and expand the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCUs) (also referred to as "coding tree units") that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In accordance with the techniques of this disclosure, a video coder, such as video encoder 20 or video decoder 30, may be configured to perform improved illumination compensation. In one example, when both ARP and illumination compensation are enabled for one slice and a current coding unit (CU) is inter-coded, the signaling of ic_flag may be dependent on the value of a weighting factor signaled for ARP. When ic_flag is not signaled, the video coder may always assume that illumination compensation is disabled for the current CU. When no ic_flag is signaled for any CU of a slice, the video coder may disable illumination compensation for the current slice, and therefore, the slice_ic_enable_flag may not need to be signalled if the above fact is determined by checking syntax elements in the slice or higher level, such as whether the current picture is an intra random access picture (IRAP).

In one example, a video coder, such as video encoder 20 or video decoder 30, generally determines a value for an advanced residual prediction (ARP) weighting factor of a current block, such as a current CU. Video encoder 20, for example, may determine whether ARP is to be used to encode at least a portion (e.g., a PU) of the CU. For instance, video encoder 20 may perform rate-distortion analysis to determine whether ARP yields the base rate-distortion metrics when encoding a portion of the CU, and if so, may encode the portion of the CU using ARP. Encoding the portion of the CU using ARP may include assigning a non-zero value to an ARP weighting factor, e.g., 0.5 or 1.0. As another example, video decoder 30 may determine a signaled value for the ARP weighting factor of the current CU, and determine whether an illumination compensation syntax element will be present in the bitstream (i.e., whether an illumination compensation syntax will be received) based on the value of the ARP weighting factor.

The video coder may code an illumination compensation syntax element (e.g., ic_flag) for the current CU and code the current CU based at least in part on the value of the illumination compensation syntax element when the value of the ARP weighting factor is equal to zero (or, more generally, whether ARP is used to predict the current CU). As explained herein, illumination compensation and ARP are typically not performed together. That is, if a video coder codes a block using ARP, the video coder will likely not also use illumination compensation to code the block, and likewise, if the video coder codes the block using illumination compensation, the video coder will likely not also use ARP to code the block. Therefore, if ARP is not used to code the block (e.g., as evidenced by a value of zero for the ARP weighting factor), the video coder may code (e.g., signal or decode) an illumination compensation syntax element, such as ic_flag, that indicates whether illumination compensation is used. Similarly, if ARP is used (e.g., as evidenced by a non-zero value for an ARP weighting factor), the video coder may omit (i.e., not perform or refrain from) coding the illumination compensation syntax element.

For example, when ARP is not used (e.g., when the ARP weighting factor has a value of zero), video encoder 20 may encode a value for the illumination compensation syntax element. If video encoder 20 determines to use illumination compensation to code the block (e.g., based on rate-distortion metrics as explained above), video encoder 20 may signal a value for the illumination compensation syntax element that indicates that illumination compensation is used, and moreover, video encoder 20 may encode the block using illumination compensation. Similarly, video decoder 30 may determine that the illumination compensation syntax element will be present in the bitstream when the ARP weighting factor has a value of zero.

On the other hand, if the value of the ARP weighting factor is not equal to zero, the video coder may skip coding of the illumination compensation syntax element for the current block and code the current block, e.g., using ARP. Video encoder 20 may skip encoding of the illumination compensation syntax element by, for example, not inserting the illumination compensation syntax element into the bitstream. Video decoder 30, likewise, may determine that the illumination compensation syntax element will not be present in the bitstream for a block when the ARP weighting factor for the block has a non-zero value (e.g., a value of 0.5 or 1.0).

In one example, the video coder does not signal/decode the ic_flag when the ARP weighting factor of current CU is not equal to 0. In one example, the ic_flag is signaled if and only if all of the following conditions are true:
  a. The weighting factor signaled for ARP of the current CU is equal to 0; and
  b. At least one of the following is true (equivalent to icEnableFlag is equal to 1 in the current 3D-HEVC):
     i. The current PU (coded with 2N×2N) is coded with merge mode, and (slice_ic_disable_merge_zero_idx_flag is equal to 0 or the merge index is not equal to 0); or
     ii. The current PU (coded with 2N×2N) is coded with AMVP mode, either of the reference indices corresponding to RefPicList0 and RefPicList1 corresponds to an inter-view reference picture.
  c. Alternatively, or in addition, the current picture is an IRAP picture.

In one example, the video coder signals/decodes the ic_flag based on the ARP weighting factor and whether the current picture is an IRAP picture, but not on whether the current CU is coded with merge or AMVP and not on the merge index. Various examples include:
  a. If and only if the ARP weighting factor of the current coding unit (CU) is equal to 0 and the current picture is an IRAP picture, ic_flag is signaled by the encoder and decoded by the decoder.
  b. Alternatively, if and only if the ARP weighting factor of the current coding unit (CU) is equal to 0 and the current picture has slice_ic_disable_merge_zero_idx_flag is equal to 1, ic_flag is signaled by the encoder and decoded by the decoder.
  c. Alternatively, if and only if the ARP weighting factor of the current coding unit (CU) is equal to 0 and the current CU is coded with skip mode, the illumination compensation syntax element is signaled by the encoder and decoded by the decoder.
  d. Alternatively, if and only if the ARP weighting factor of the current coding unit (CU) is equal to 0 and the current CU has only one partition (i.e., partition mode equal to PART_2N×2N), the illumination compensation syntax element is signaled by the encoder and decoded by the decoder.

In one example, the video coder signals/decodes ic_flag if and only if the ARP weighting factor of current CU is equal to 0. In this case, when the current picture is an IRAP picture and the ARP weighting factor is not signaled, the ARP weighting factor may be inferred to be 0 for the current CU.

Alternatively, or in addition, the ARP weighting factor may be signaled/decoded even for an IRAP picture. Therefore, when this weighting factor is not equal to 0, it indicates the disabling of the illumination compensation mode and no ic_flag needs to be signaled. However, in this case, even the ARP weighting factor is non-zero, if the decoding process does not find the proper motion vectors, disparity vectors or disparity motion vectors, or does not find the proper relevant pictures, advanced residual prediction may be disabled for the current PU. Therefore, the PU can be decoded in the same way as the case in which the ARP weighting factor is equal to 0. Therefore, here, the major purpose of signaling the ARP weighting factor may be to disable the signaling of the ic_flag.

A flag may be added in the video parameter set (VPS), sequence parameter set (SPS), and/or the picture parameter set (PPS) to indicate the usage of IC for each layer or for all layers.

The techniques of this disclosure are described in greater detail below with respect to Tables 1-4. Deletions compared to current 3D-HEVC working draft have been identified using [removed: " "], and newly added parts are italicized. Table 1 represents an example of a modified syntax table for a coding unit.

TABLE 1

| coding_unit( x0, y0, log2CbSize , ctDepth) { | Descriptor |
|---|---|
|   if( transquant_bypass_enable_flag ) { | |
|     cu_transquant_bypass_flag | ae(v) |
|   } | |
|   if( slice_type != I ) | |
|     skip_flag[ x0 ][ y0 ] | ae(v) |
|   if( skip_flag[ x0 ][ y0 ] ) { | |
|     prediction_unit( x0, y0, log2CbSize ) | |
|     if ( iv_res_pred_flag [removed: "&& TempRefPicInListsFlag"] ) | |
|       iv_res_pred_weight_idx | ae(v) |
|     if ( *!iv_res_pred_weight_idx &&* icEnableFlag ) | |
|       ic_flag | ae(v) |
|   } | |
|   else { | |
|     nCbS = ( 1 << log2CbSize ) | |
|     if( slice_type != I ) | |
|       pred_mode_flag | |
|     if( ( PredMode[ x0 ][ y0 ] ! = MODE_INTRA || log2CbSize = = Log2MinCbSize ) && | |
|       !predPartModeFlag) | |
|       part_mode | ae(v) |
|     if( PredMode[ x0 ][ y0 ] = = MODE_INTRA ) { | |
|       if( PartMode = = PART_2N×2N && pcm_enabled_flag && | |

TABLE 1-continued

| coding_unit( x0, y0, log2CbSize , ctDepth) { | Descriptor |
|---|---|
|     log2CbSize >= Log2MinIPCMCUSize && | |
|     log2CbSize <= Log2MaxIPCMCUSize ) | |
|     pcm_flag | ae(v) |
|   if( pcm_flag ) { | |
|     num_subsequent_pcm | tu(3) |
|     NumPCMBlock = num_subsequent_pcm + 1 | |
|     while( !byte_aligned( ) ) | |
|       pcm_alignment_zero_bit | f(1) |
|     pcm_sample( x0, y0, log2CbSize ) | |
|   } else { | |
|     pbOffset = ( PartMode = = PART_NxN ) ? ( nCbS / 2 ) : 0 | |
|     log2PbSize = log2CbSize − ( PartMode = = PART_NxN ? 1 : 0 ) | |
|     for( j = 0; j <= pbOffset; j = j + pbOffset ) | |
|     for( i = 0; i <= pbOffset; i = i + pbOffset ) { | |
|       if( vps_depth_modes_flag[ nuh_layer_id ] ) | |
|         depth_mode_parameters( x0 + i , y0 + j ) | |
|       if( depth_intra_mode[ x0 + i ][ y0 + j ] = = INTRA_DEP_NONE ) | |
|         prev_intra_luma_pred_flag[ x0 + i ][ y0 + j ] | ae(v) |
|     } | |
|     for( j = 0; j <= pbOffset; j = j + pbOffset ) | |
|     for( i = 0; i <= pbOffset; i = i + pbOffset ) { | |
|       if( depth_intra_mode[ x0 + i ][ y0 + j ] = = INTRA_DEP_NONE) { | |
|         if( prev_intra_luma_pred_flag[ x0 + i ][ y0 + j ] ) | |
|           mpm_idx[ x0 + i ][ y0 + j ] | ae(v) |
|         else | |
|           rem_intra_luma_pred_mode[ x0 + i ][ y0 + j ] | ae(v) |
|       } | |
|     } | |
|     if ( !SdcFlag[ x0 ][ y0 ] ) | |
|       intra_chroma_pred_mode[ x0 ][ y0 ] | ae(v) |
|   } | |
|   } else { | |
|     if( PartMode = = PART_2Nx2N ) { | |
|       if ( iv_res_pred_flag [removed: "&& TempRefPicInListsFlag"] ) | |
|         iv_res_pred_weight_idx | ae(v) |
|       prediction_unit( x0, y0, nCbS, nCbS ) | |
|     } else if( PartMode = = PART_2NxN ) { | |
|       prediction_unit( x0, y0, nCbS, nCbS / 2 ) | |
|       prediction_unit( x0, y0 + ( nCbS / 2 ), nCbS, nCbS / 2 ) | |
|     } else if( PartMode = = PART_Nx2N ) { | |
|       prediction_unit( x0, y0, nCbS / 2, nCbS ) | |
|       prediction_unit( x0 + ( nCbS / 2 ), y0, nCbS / 2, nCbS ) | |
|     } else if( PartMode = = PART_2NxnU ) { | |
|       prediction_unit( x0, y0, nCbS, nCbS / 4 ) | |
|       prediction_unit( x0, y0 + ( nCbS / 4 ), nCbS, nCbS *3 / 4 ) | |
|     } else if( PartMode = = PART_2NxnD ) { | |
|       prediction_unit( x0, y0, nCbS, nCbS *3 / 4 ) | |
|       prediction_unit( x0, y0 + ( nCbS * 3 / 4 ), nCbS, nCbS / 4 ) | |
|     } else if( PartMode = = PART_nLx2N ) { | |
|       prediction_unit( x0, y0, nCbS /4, nCbS ) | |
|       prediction_unit( x0 + ( nCbS / 4 ), y0, nCbS *3 / 4, nCbS) | |
|     } else if( PartMode = = PART_nRx2N ) { | |
|       prediction_unit( x0, y0, nCbS *3 / 4, nCbS ) | |
|       prediction_unit( x0 + ( nCbS * 3 / 4 ), y0, nCbS / 4, nCbS ) | |
|     } else { /* PART_NxN */ | |
|       prediction_unit( x0, y0, nCbS / 2, nCbS / 2) | |
|       prediction_unit( x0 + ( nCbS / 2 ), y0, nCbS / 2, nCbS / 2 ) | |
|       prediction_unit( x0, y0 + ( nCbS / 2 ), nCbS / 2, nCbS / 2 ) | |
|       prediction_unit( x0 + ( nCbS / 2 ), y0 + ( nCbS / 2 ), nCbS / 2, nCbS / 2 ) | |
|     } | |
|   } | |
|   if ( !iv_res_pred_weight_idx && icEnableFlag ) | |
|     ic_flag | ae(v) |
|   if( !pcm_flag ) { | |
|     if( PredMode[ x0 ][ y0 ] != MODE_INTRA && | |
|       !(PartMode = = PART_2Nx2N && merge_flag[x0][y0]) ) | |
|       no_residual_syntax_flag | ae(v) |
|     if( !no_residual_syntax_flag ) { | |
|       MaxTrafoDepth = ( PredMode[ x0 ][ y0 ] = = MODE_INTRA ? | |
|                 max_transform_hierarchy_depth_intra + IntraSplitFlag | |
|                 max_transform_hierarchy_depth_inter ) | |
|       transform_tree( x0, y0 x0, y0, log2CbSize, 0, 0 ) | |
|     } | |
|   } | |
|   } | |
| } | |

Table 2 represents an alternative example of a modified syntax table for a coding unit

TABLE 2

| coding_unit( x0, y0, log2CbSize , ctDepth) { | Descriptor |
|---|---|
|   if( transquant_bypass_enable_flag ) { | |
|     cu_transquant_bypass_flag | ae(v) |
|   } | |
|   if( slice_type != I ) | |
|     skip_flag[ x0 ][ y0 ] | ae(v) |
|   if( skip_flag[ x0 ][ y0 ] ) { | |
|     prediction_unit( x0, y0, log2CbSize ) | |
|     if ( iv_res_pred_flag && [removed: "TempRefPicInListsFlag"] !( nal_unit_type > = BLA_W_LP && nal_unit_type < = RSV_IRAP_VCL23 )) | |
|       iv_res_pred_weight_idx | ae(v) |
|     if ( !iv_res_pred_weight_idx && icEnableFlag ) | |
|       ic_flag | ae(v) |
|   } else { | |
|     if( PartMode = = PART_2N×2N) { | |
|       if ( iv_res_pred_flag [removed: "&& TempRefPicInListsFlag"] !( nal_unit_type > = BLA_W_LP && nal_unit_type < = RSV_IRAP_VCL23 )) | |
|         iv_res_pred_weight_idx | ae(v) |
|       prediction_unit( x0, y0, nCbS, nCbS ) | |
|     } else if( PartMode = = PART_2N×N ) { | |
|     ... | |
|   } | |
|   if ( !iv_res_pred_weight_idx && icEnableFlag ) | |
|     ic_flag | ae(v) |
| ... | |
|   if( !pcm_flag ) { | |
|     if( PredMode[ x0 ][ y0 ] != MODE_INTRA && !(PartMode = = PART_2N×2N && merge_flag[x0][y0]) ) | |
|       no_residual_syntax_flag | ae(v) |
|     if( !no_residual_syntax_flag ) { | |
|       MaxTrafoDepth = ( PredMode[ x0 ][ y0 ] = = MODE_INTRA ? max_transform_hierarchy_depth_intra + IntraSplitFlag : max_transform_hierarchy_depth_inter ) | |
|       transform_tree( x0, y0 x0, y0, log2CbSize, 0, 0 ) | |
|     } | |
|   } | |
|   } | |
| } | |

Additionally or alternatively, the general slice header syntax may be modified as shown in Table 3 below, where illumination compensation may be applied only for IRAP pictures:

TABLE 3

| slice_header( ) { | Descriptor |
|---|---|
|   first_slice_in_pic_flag | u(1) |
|   if( RapPicFlag ) | |
|     no_output_of_prior_pics_flag | u(1) |
|   pic_parameter_set_id | ue(v) |
| ... | |
|     if( ( weighted_pred_flag && slice_type = = P) \|\| ( weighted_bipred_flag && slice_type = = B ) ) | |
|       pred_weight_table( ) | |
|     else if( layer_id && ( nal_unit_type > = BLA_W_LP && nal_unit_type < = RSV_IRAP_VCL23 )) { | |
|       slice_ic_enable_flag | u(1) |
|       [removed: "slice_ic_disable_merge_zero_idx_flag } | u(1)"] |
|       five_minus_max_num_merge_cand | ue(v) |
|     } | |
| } | |

In this example, the following semantics of Table 3 may be changed, as shown:

[removed: "slice_ic_disable_merge_zero_idx_flag equal to 1 specifies that ic_flag is not present in the coding units of the current slice when merge_flag is equal to 1 and merge_idx of the first prediction unit of the coding unit is equal to 0. slice_ic_disable_merge_zero_idx_flag equal to 0 specifies that ic_flag might be present in the coding units of the current slice when merge_flag is equal to 1 and merge_idx of the first prediction unit of the coding unit is equal to 0. When not present, slice_ic_disable_merge_zero_idx_flag is inferred to be equal to 0. [Ed. (GT): Replace term first prediction unit]"]

In addition, or in the alternative, to the modifications shown in Table 3, the coding unit syntax and semantics may be modified as discussed with respect to Table 4, below.

TABLE 4

| coding_unit( x0, y0, log2CbSize , ctDepth) { | Descriptor |
|---|---|
|   if( transquant_bypass_enable_flag ) { | |
|     cu_transquant_bypass_flag | ae(v) |
|   } | |
|   if( slice_type != I ) | |
|     skip_flag[ x0 ][ y0 ] | ae(v) |
|   if( skip_flag[ x0 ][ y0 ] ) { | |
|     prediction_unit( x0, y0, log2CbSize ) | |
|     if ( iv_res_pred_flag [removed: "&& TempRefPicInListsFlag"] ) | |
|       iv_res_pred_weight_idx | ae(v) |
|     if ( !iv_res_pred_weight_idx && slice_ic_enable_flag [removed: "icEnableFlag"] ) | |
|       ic_flag | ae(v) |
|   } | |
|   else { | |
|     nCbS = ( 1 << log2CbSize ) | |
|     if( slice_type != I ) | |
|       pred_mode_flag | ae(v) |
|     if( ( PredMode[ x0 ][ y0 ] ! = MODE_INTRA \|\| log2CbSize = = Log2MinCbSize ) && !predPartModeFlag) | |
|       part_mode | ae(v) |
|     if( PredMode[ x0 ][ y0 ] = = MODE_INTRA ) { | |
|       if( PartMode = = PART_2N×2N && pcm_enabled_flag && log2CbSize >= Log2MinIPCMCUSize && log2CbSize <= Log2MaxIPCMCUSize ) | |
|         pcm_flag | ae(v) |
|       if( pcm_flag ) { | |
|         num_subsequent_pcm | tu(3) |
|         NumPCMBlock = num_subsequent_pcm + 1 | |
|         while( !byte_aligned( ) ) | |
|           pcm_alignment_zero_bit | f(1) |
|         pcm_sample( x0, y0, log2CbSize ) | |
|       } else { | |
|         pbOffset = ( PartMode = = PART_N×N ) ? ( nCbS / 2 ) : 0 | |
|         log2PbSize = log2CbSize − ( PartMode = = PART_N×N ? 1 : 0 ) | |
|         for( j = 0; j <= pbOffset; j = j + pbOffset ) | |
|           for( i = 0; i <= pbOffset; i = i + pbOffset ) { | |
|             if( vps_depth_modes_flag[ nuh_layer_id ] ) | |
|               depth_mode_parameters( x0 + i , y0 + j ) | |
|             if( depth_intra_mode[ x0 + i ][ y0 + j ] = = INTRA_DEP_NONE ) | |
|               prev_intra_luma_pred_flag[ x0 + i ][ y0 + j ] | ae(v) |
|           } | |
|         for( j = 0; j <= pbOffset; j = j + pbOffset ) | |
|           for( i = 0; i <= pbOffset; i = i + pbOffset ) { | |
|             if( depth_intra_mode[ x0 + i ][ y0 + j ] = = INTRA_DEP_NONE) { | |
|               if( prev_intra_luma_pred_flag[ x0 + i ][ y0 + j ] ) | |
|                 mpm_idx[ x0 + i ][ y0 + j ] | ae(v) |
|               else | |
|                 rem_intra_luma_pred_mode[ x0 + i ][ y0 + j ] | ae(v) |
|             } | |
|           } | |
|         if ( !SdcFlag[ x0 ][ y0 ] ) | |
|           intra_chroma_pred_mode[ x0 ][ y0 ] | ae(v) |
|       } | |
|     } else { | |
|       if( PartMode = = PART_2N×2N) { | |
|         if( iv_res_pred_flag [removed: "&& TempRefPicInListsFlag"] ) | |
|           iv_res_pred_weight_idx | ae(v) |
|         prediction_unit( x0, y0, nCbS, nCbS ) | |
|       } else if( PartMode = = PART_2N×N ) { | |
|         prediction_unit( x0, y0, nCbS, nCbS / 2 ) | |
|         prediction_unit( x0, y0 + ( nCbS / 2 ), nCbS, nCbS / 2 ) | |
|       } else if( PartMode = = PART_N×2N ) { | |
|         prediction_unit( x0, y0, nCbS / 2, nCbS ) | |
|         prediction_unit( x0 + ( nCbS / 2 ), y0, nCbS / 2, nCbS ) | |
|       } else if( PartMode = = PART_2N×nU ) { | |
|         prediction_unit( x0, y0, nCbS, nCbS / 4 ) | |
|         prediction_unit( x0, y0 + ( nCbS / 4 ), nCbS, nCbS *3 / 4 ) | |
|       } else if( PartMode = = PART_2N×nD ) { | |
|         prediction_unit( x0, y0, nCbS, nCbS *3 / 4 ) | |
|         prediction_unit( x0, y0 + ( nCbS * 3 / 4 ), nCbS, nCbS / 4 ) | |
|       } else if( PartMode = = PART_nL×2N ) { | |
|         prediction_unit( x0, y0, nCbS /4, nCbS ) | |
|         prediction_unit( x0 + ( nCbS / 4 ), y0, nCbS *3 / 4, nCbS) | |
|       } else if( PartMode = = PART_nR×2N ) { | |
|         prediction_unit( x0, y0, nCbS *3 / 4, nCbS ) | |
|         prediction_unit( x0 + ( nCbS * 3 / 4 ), y0, nCbS / 4, nCbS ) | |
|       } else { /* PART_N×N */ | |

TABLE 4-continued

```
coding_unit( x0, y0, log2CbSize , ctDepth) {                                         Descriptor
        prediction_unit( x0, y0, nCbS / 2, nCbS / 2)
        prediction_unit( x0 + ( nCbS / 2 ), y0, nCbS / 2, nCbS / 2 )
        prediction_unit( x0, y0 + ( nCbS / 2 ), nCbS / 2, nCbS / 2 )
        prediction_unit( x0 + ( nCbS / 2 ), y0 + ( nCbS / 2 ), nCbS / 2, nCbS / 2 )
      }
    }
    if ( !iv_res_pred_weight_idx && slice_ic_enable_flag [removed:
"icEnableFlag"] )
      ic_flag                                                                         ae(v)
    if( !pcm_flag ) {
      if( PredMode[ x0 ][ y0 ] != MODE_INTRA &&
        !(PartMode = = PART_2Nx2N && merge_flag[x0][y0]) )
        no_residual_syntax_flag                                                       ae(v)
      if( !no_residual_syntax_flag ) {
        MaxTrafoDepth = ( PredMode[ x0 ][ y0 ] = = MODE_INTRA ?
                          max_transform_hierarchy_depth_intra +
IntraSplitFlag :
                          max_transform_hierarchy_depth_inter )
        transform_tree( x0, y0 x0, y0, log2CbSize, 0, 0 )
      }
    }
  }
}
```

The semantics of syntax elements of Table 4 may be modified as discussed below, where "(H-#)" refers to a section of 3D-HEVC:
[removed: "The variable icEnableFlag is set equal to 0 and when slice_ic_enable_flag is equal to 1 and PartMode is equal to 2N×2N and PredMode[x0][y0] is not equal to MODE_INTRA, the following applies:

If merge_flag[x0][y0] is equal to 1, the following applies:

icEnableFlag=(merge_idx[x0][y0]!=0)||!slice_ic_disable_merge_zero_idx_flag         (H-9)

Otherwise (merge_flag[x0][y0] is equal to 0), the following applies:
  With X being replaced by 0 and 1, the variable refViewIdxLX is set equal to the view order index of RefPicListLX[ref_idx$_{LXTx}$0][y0] ].
The flag icEnableFlag is derived as specified in the following:

icEnableFlag=(inter_pred_idc[x0][y0]!=Pred_L0 && refViewIdxL1[x0][y0]!=ViewIdx)||(inter_pred_idc[x0][y0]!=Pred_L1 && refViewIdxL0[x0][y0]!=ViewIdx)    (H-10)"]

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
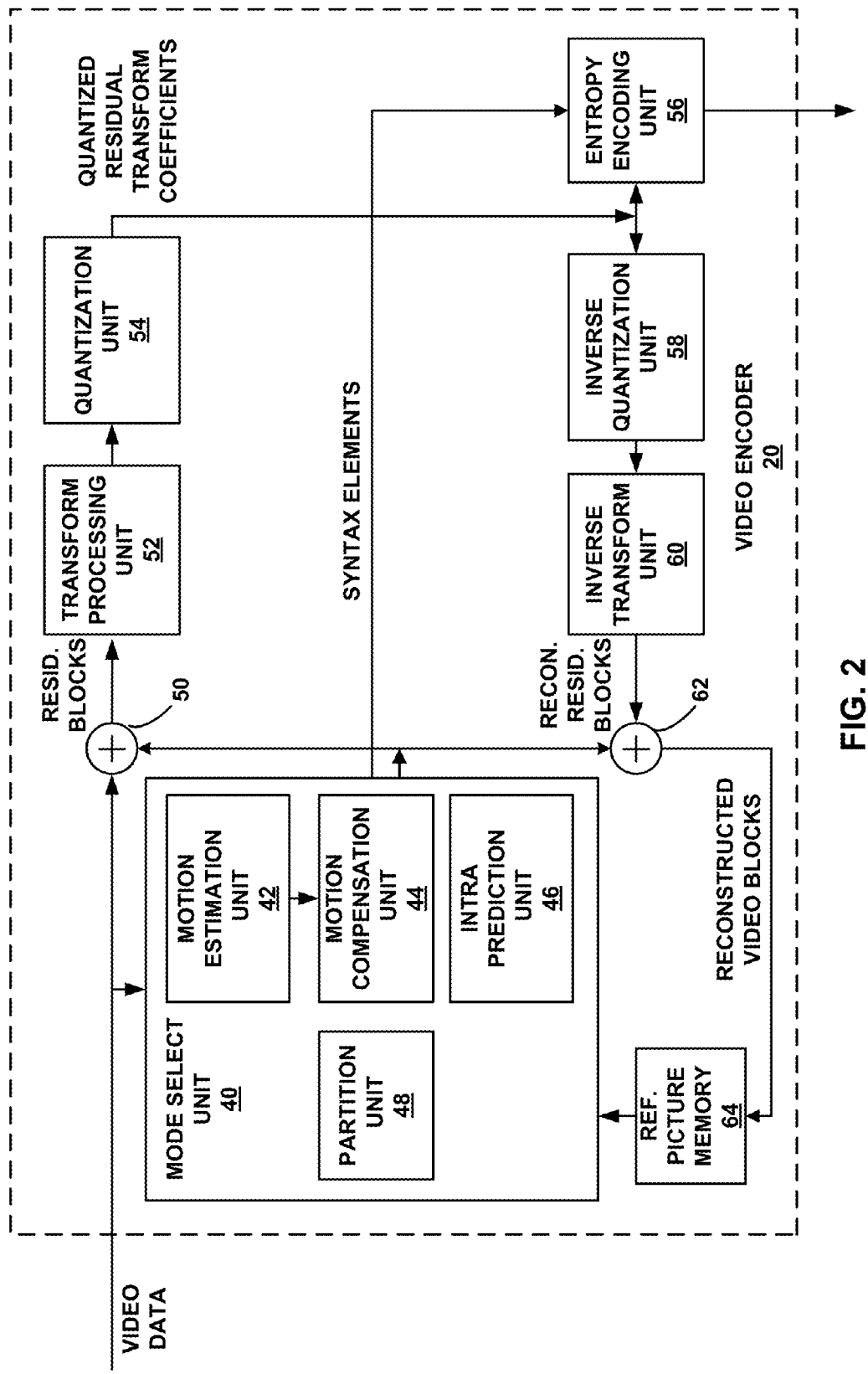
FIG. 2 is a block diagram illustrating an example of a video encoder that may implement techniques for signaling illumination compensation.

FIG. 2 is a block diagram illustrating an example of video encoder 20 that may implement techniques for signaling illumination compensation. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results (e.g., evaluated using rate-distortion metrics), and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Motion compensation unit 44 may be configured to perform motion compensation using various techniques. For example, motion compensation unit 44 may perform general temporal motion compensation for a current block, substantially as discussed above. Additionally, motion compensation unit 44 may be configured to perform advanced residual prediction (ARP). That is, motion compensation unit 44 may use both a first predictor for a current block, obtained using a temporal motion vector, and a second predictor for the current block, obtained using both a disparity vector and the temporal motion vector, to predict the current block. Furthermore, motion compensation unit 44 may also be configured to perform illumination compensation. As discussed in greater detail below, illumination compensation generally involves applying one or more linear equations to sample (i.e., pixel) values of a predicted block based on neighboring samples/pixels to the predicted block and/or neighboring samples/pixels to the current block.

Intra prediction unit 46 may intra-predict a current block, as an alternative to the inter-prediction performed by motion estimation unit 42 and motion compensation unit 44, as described above. In particular, intra prediction unit 46 may determine an intra-prediction mode to use to encode a current block. In some examples, intra prediction unit 46 may encode a current block using various intra-prediction modes, e.g., during separate encoding passes, and intra prediction unit 46 (or mode select unit 40, in some examples) may select an appropriate intra-prediction mode to use from the tested modes.

For example, intra prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra prediction unit 46 may calculate ratios from the distortions and rates for the various encoded blocks to determine which intra-prediction mode exhibits the best rate-distortion value for the block.

After selecting an intra-prediction mode for a block, intra prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The quantization process may also be referred to as a "scaling" process, and thus, quantized transform coefficients may also be referred to as "scaled transform coefficients." The degree of quantization (or scaling) may be modified by adjusting a quantization parameter. In some examples, entropy encoding unit 56 may then perform a scan of the matrix including the quantized transform coefficients.

Following quantization, entropy encoding unit 56 entropy codes the scanned, quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

Mode select unit 40 may compare encoding results between various modes for a block to ultimately select an encoding mode for the block. For example, mode select unit 40 may compare rate-distortion metrics for modes including temporal motion compensation, inter-view motion compensation, advanced residual prediction, and illumination compensation. Mode select unit 40 may select the coding mode that yields the best rate-distortion metrics for the current block.

When mode select unit 40 selects ARP as the coding mode for a block, mode select unit 40 may further determine a weighting factor to be applied during ARP. Again, mode select unit 40 may compare rate-distortion metrics between various potential weighting factors, e.g., 0.5 and 1.0, and select the weighting factor that yields the best rate-distortion metrics. Entropy encoding unit 56 may encode a value for a weighting factor syntax element representative of the weighting factor selected by mode select unit 40 for the block. When mode select unit 40 selects a mode other than ARP, entropy encoding unit 56 may encode a value for the weighting factor syntax element that indicates that the ARP weighting factor has a value of 0.

In accordance with the techniques of this disclosure, when the ARP weighting factor has a value of 0, entropy encoding unit 56 may further encode a value for an illumination compensation syntax element (e.g., ic_flag) that indicates whether the corresponding block is encoded using illumination compensation. For example, if mode select unit 40 determines not to encode a block using ARP but instead using illumination compensation, entropy encoding unit 56 may encode a value for an illumination compensation syntax element that indicates that the block is encoded using illumination compensation. Similarly, if mode select unit 40 determines not to encode a block using ARP and not using illumination compensation but a different mode, entropy encoding unit 56 may encode a value for an illumination compensation syntax element that indicates that the block is not encoded using illumination compensation. One or more separate syntax elements may then indicate the actual coding mode used to encode the block.

Furthermore, when the ARP weighting factor has a non-zero value, entropy encoding unit 56 may skip encoding of the illumination compensation syntax element. That is, video encoder 20 may be configured to avoid inserting a value for the illumination compensation syntax element into a resulting bitstream that includes encoded video data. In some examples, video encoder 20 may also encode a block-level illumination compensation enabled syntax element, e.g., icEnableFlag. Video encoder 20 may further be configured to code a value for a block-level illumination compensation syntax element (which indicates whether illumination compensation is actually used for the block) only when the block-level illumination compensation enabled syntax element indicates that illumination compensation is enabled for the block.

Additionally or alternatively, in some examples, video encoder 20 may encode a slice-level illumination compensation syntax element, e.g., slice_ic_enable_flag. Video encoder 20 may further be configured to code a value for a block-level illumination compensation syntax element only when the slice-level illumination compensation syntax element indicates that illumination compensation is enabled for the slice including the corresponding block. When video encoder 20 encodes blocks of an entire slice without determining to use illumination compensation for any of the blocks of the slice, video encoder 20 may set the value of the slice-level illumination compensation syntax element to indicate that illumination compensation is disabled for the slice.

ARP and illumination compensation are inter-prediction techniques. Therefore, in some examples, video encoder 20 only encodes values for the ARP weighting factor and/or the illumination compensation syntax elements when the corresponding block is inter-predicted. For intra-predicted blocks, video encoder 20 may skip encoding of the ARP weighting factor and the illumination compensation syntax elements.

In this manner, video encoder 20 of FIG. 2 represents an example of a video encoder configured to determine a value for an advanced residual prediction (ARP) weighting factor of a current block of the video data and to skip coding (i.e., encoding) of an illumination compensation syntax element for the current block and to code the current block when the value of the ARP weighting factor is not equal to zero. The example of video encoder 20 of FIG. 2 is further configured to code the illumination compensation syntax element for the current block and code the current block based at least in part on the value of the illumination compensation syntax element when the value of the ARP weighting factor is equal to zero. Unless otherwise indicated, "code" and "coding" as used with respect to video encoder 20 are intended to be understood as "encode" and "encoding." However, it should be understood that "code" and "coding" may also refer to "decode" and "decoding," e.g., when used with respect to video decoder 30 of FIGS. 1, 3.

Figure 3:
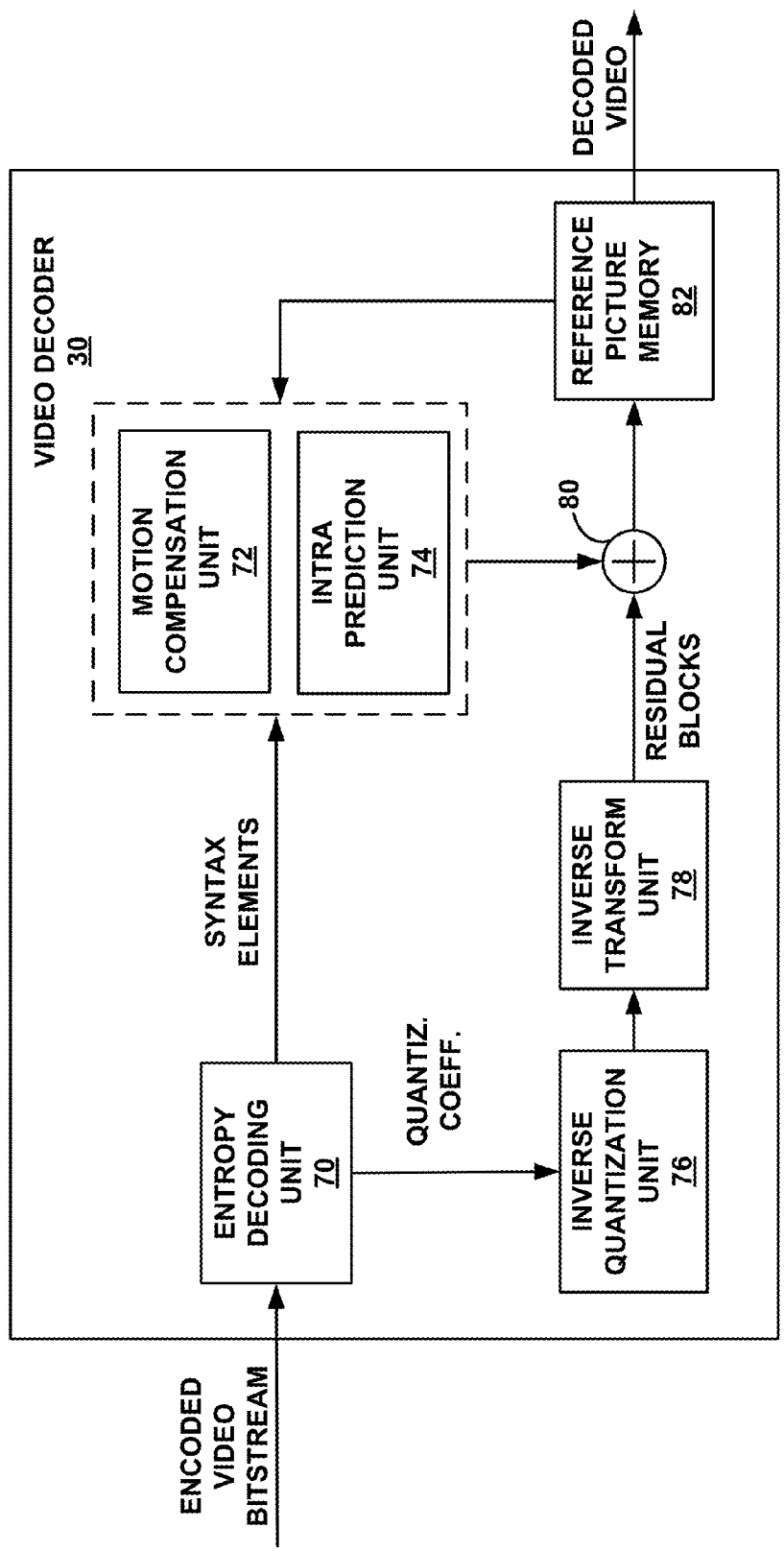
FIG. 3 is a block diagram illustrating an example of a video decoder that may implement techniques for signaling illumination compensation.

FIG. 3 is a block diagram illustrating an example of video decoder 30 that may implement techniques for signaling illumination compensation. In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

In accordance with the techniques of this disclosure, entropy decoding unit 70 may entropy decode a value for an ARP weighting factor of a current block. If the ARP weighting factor has a non-zero value, entropy decoding unit 70 may determine that an illumination compensation syntax element (e.g., ic_flag) will not be included in the bitstream, and therefore, that subsequent bits of the bitstream represent a different syntax element than an illumination compensation syntax element. On the other hand, if the ARP weighting factor has a value of zero, entropy decoding unit 70 may determine that an illumination compensation syntax element is present in the bitstream, and moreover, decode a value for the illumination compensation syntax element.

When the ARP weighting factor has a non-zero value (e.g., 0.5 or 1.0), motion compensation unit 72 may use ARP to decode a corresponding block. For instance, as explained in greater detail below, motion compensation unit 72 may determine a first predictor using a temporal motion vector, determine a second predictor using a disparity vector and the temporal motion vector, apply the ARP weighting factor to the second predictor, and calculate the predictor for the current block from the first predictor and the second predictor to which the ARP weighting factor has been applied.

When the ARP weighting factor has a value of zero, entropy decoding unit 70 may decode a value for an illumination compensation syntax element for the current block that indicates whether the current block is coded using illumination compensation. If the illumination compensation syntax element indicates that the current block is coded using illumination compensation, motion compensation unit 72 may predict the current block using illumination compensation. On the other hand, if the illumination compensation syntax element indicates that the current block is not coded using illumination compensation, motion compensation unit 72 may predict the current block using a different prediction mode, e.g., temporal prediction or inter-view prediction.

In some examples, video decoder 30 may also decode a block-level illumination compensation enabled syntax element, e.g., icEnableFlag. Video decoder 30 may further be configured to decode a value for a block-level illumination compensation syntax element (which indicates whether illumination compensation is actually used for the block) only when the block-level illumination compensation enabled syntax element indicates that illumination compensation is enabled for the block.

Additionally or alternatively, in some examples, video decoder 30 may decode a slice-level illumination compensation syntax element, e.g., slice_ic_enable_flag. Video decoder 30 may further be configured to decode a value for a block-level illumination compensation syntax element only when the slice-level illumination compensation syntax element indicates that illumination compensation is enabled for the slice including the corresponding block. When video decoder 30 the slice-level illumination compensation syntax element indicates that illumination compensation is disabled for the slice, video decoder 30 may determine that illumination compensation syntax elements will not be present in the bitstream for any of the blocks of the slice.

ARP and illumination compensation are inter-prediction techniques. Therefore, in some examples, video decoder 30 only decodes values for the ARP weighting factor and/or the illumination compensation syntax elements when the corresponding block is inter-predicted. Video decoder 30 may determine that the ARP weighting factor and the illumination compensation syntax elements are not present for intra-predicted blocks.

In general, video decoder 30 reproduces residual data for a block to be combined with predicted data for the block in order to decode the block. Inverse quantization unit 76 inverse quantizes, i.e., de-quantizes, quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied. Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

In this manner, video decoder 30 of FIG. 3 represents an example of a video decoder configured to determine a value for an advanced residual prediction (ARP) weighting factor of a current block of the video data and skip coding (i.e., decoding) of the illumination compensation syntax element for the current block and to code the current block when the value of the ARP weighting factor is not equal to zero. The example of video decoder 30 of FIG. 3 is further configured to code the illumination compensation syntax element for the current block and code the current block based at least in part on the value of the illumination compensation syntax element when the value of the ARP weighting factor is equal to zero. Use of the words "code" and "coding" with respect to video decoder 30 is intended in the sense of decoding, unless otherwise indicated.

Figure 4:
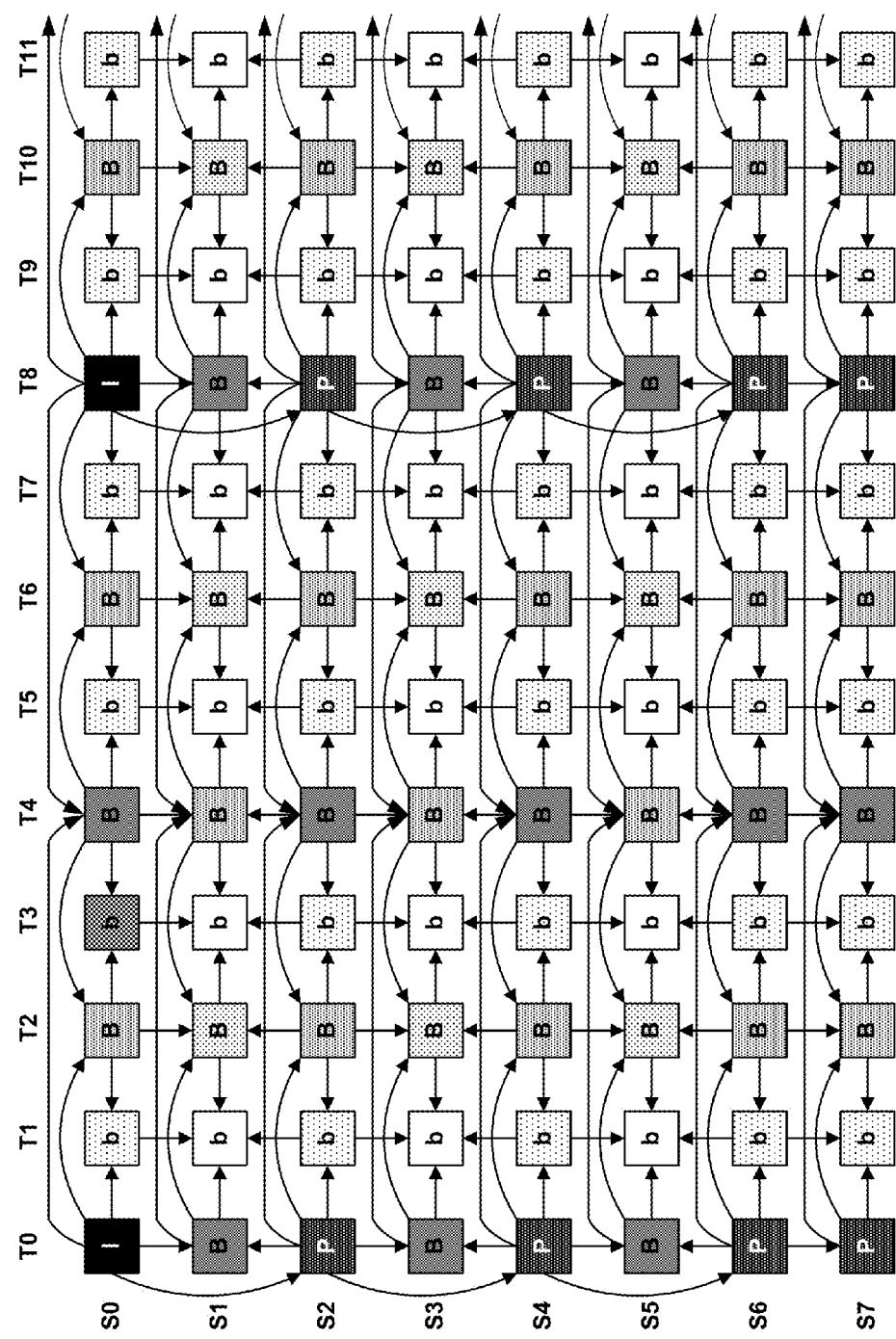
FIG. 4 is a conceptual diagram illustrating an example MVC prediction pattern.

FIG. 4 is a conceptual diagram illustrating an example MVC prediction pattern. Multi-view video coding (MVC) is an extension of ITU-T H.264/AVC. A similar technique may be applied to HEVC. In the example of FIG. 4, eight views (having view IDs "S0" through "S7") are illustrated, and twelve temporal locations ("T0" through "T11") are illustrated for each view. That is, each row in FIG. 4 corresponds to a view, while each column indicates a temporal location.

A typical MVC prediction (including both inter-picture prediction within each view and inter-view prediction) structure for multi-view video coding is shown in FIG. 4, where predictions are indicated by arrows, the pointed-to object using the point-from object for prediction reference. In MVC, inter-view prediction is performed among pictures captured in the different views of the same access unit (i.e., with the same time instance) to remove correlation between views. A picture coded with inter-view prediction may be added into a reference picture list for the inter-view prediction of the other non-base views.

Although MVC has a so-called base view which is decodable by H.264/AVC decoders and stereo view pair could be supported also by MVC, one advantage of MVC is that it could support an example that uses more than two views as a 3D video input and decodes this 3D video represented by the multiple views. A renderer of a client having an MVC decoder may expect 3D video content with multiple views.

A typical MVC decoding order arrangement is referred to as time-first coding. An access unit may include coded pictures of all views for one output time instance. For example, each of the pictures of time T0 may be included in a common access unit, each of the pictures of time T1 may be included in a second, common access unit, and so on. The decoding order is not necessarily identical to the output or display order.

Frames in FIG. 4 are indicated at the intersection of each row and each column in FIG. 4 using a shaded block including a letter, designating whether the corresponding frame is intra-coded (that is, an I-frame), or inter-coded in one direction (that is, as a P-frame) or in multiple directions (that is, as a B-frame). Frames designated as b-frames (that is, with a lowercase "b") may also be inter-coded in multiple directions, and generally refer to frames that are lower in a coding hierarchy in the view or temporal dimensions than B-frames (that is, with a capital "B"). In general, predictions are indicated by arrows, where the pointed-to frame uses the pointed-from object for prediction reference. For example, the P-frame of view S2 at temporal location T0 is predicted from the I-frame of view S0 at temporal location T0.

As with single view video encoding, frames of a multi-view video coding video sequence may be predictively encoded with respect to frames at different temporal locations. For example, the b-frame of view S0 at temporal location T1 has an arrow pointed to it from the I-frame of view S0 at temporal location T0, indicating that the b-frame is inter-predicted from the I-frame. Additionally, however, in the context of multiview video encoding, frames may be inter-view predicted. That is, a view component can use the view components in other views for reference. In MVC, for example, inter-view prediction is realized as if the view component in another view is an inter-prediction reference. The potential inter-view references may be signaled in the Sequence Parameter Set (SPS) MVC extension and can be modified by the reference picture list construction process, which enables flexible ordering of the inter-prediction or inter-view prediction references.

An inter-view prediction reference picture can be put in any position of a reference picture list in the same way as an inter prediction reference picture. In some examples, inter-view reference pictures are differentiated from temporal reference pictures by labeling the inter-view reference pictures as long-term reference pictures and labeling the temporal reference pictures as short-term reference pictures. In the context of multiview video coding, there are two kinds of motion vectors. One is a normal motion vector that points to a temporal reference picture. The corresponding temporal inter prediction mode for temporal motion vectors is referred to as motion-compensated prediction (MCP). The other type of motion vector is a disparity motion vector (DMV) that points to a picture in a different view (i.e., an inter-view reference picture). The corresponding inter prediction mode for DMVs is referred to as disparity-compensated prediction (DCP).

Figure 5:
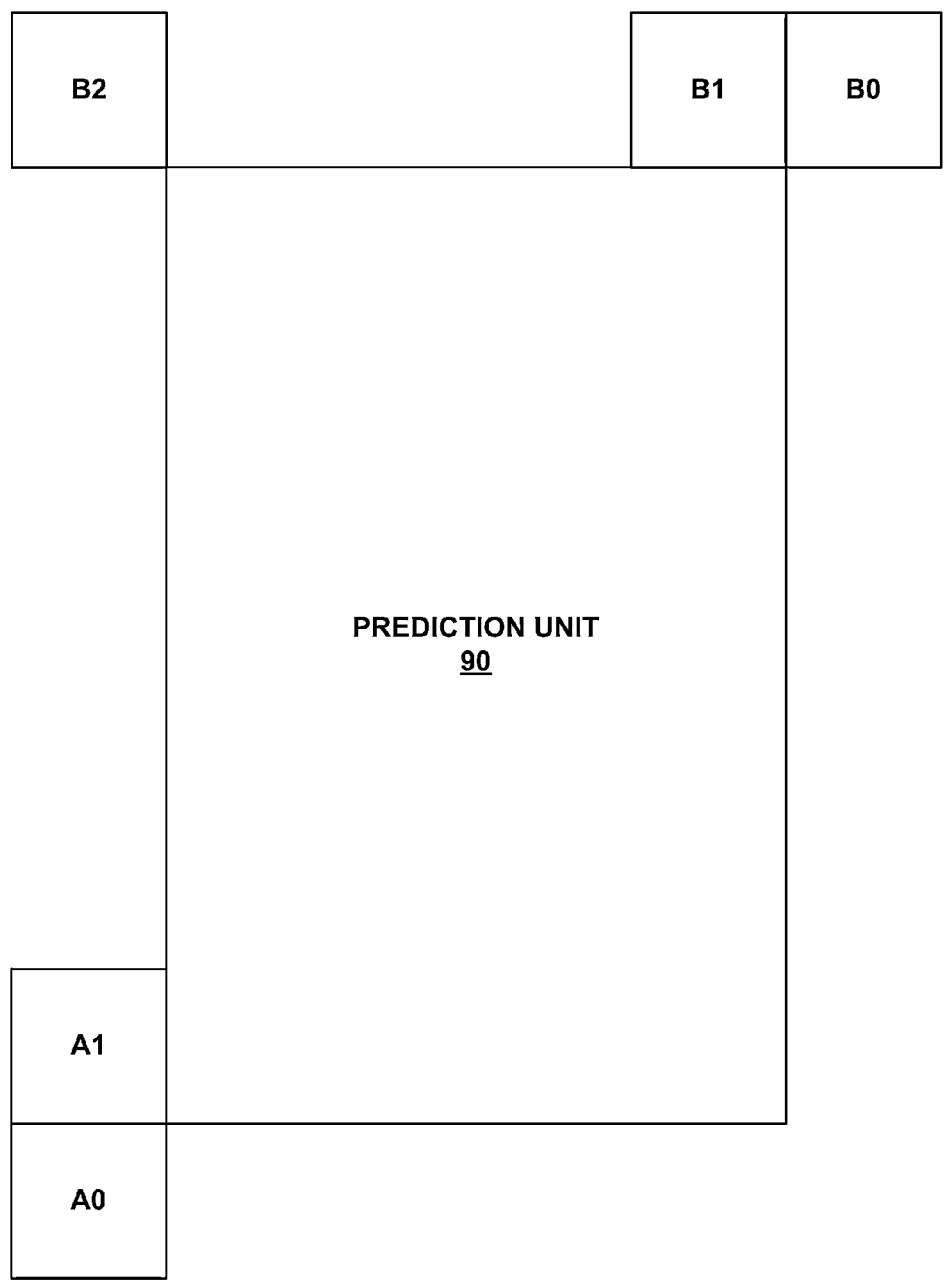
FIG. 5 is a conceptual diagram illustrating a relationship between a current prediction unit (PU) and its spatial neighboring PUs.

FIG. 5 is a conceptual diagram illustrating a relationship between a current prediction unit (PU) 90 and its spatial neighboring PUs. The spatial neighboring PUs are labeled A0, A1, B0, B1, and B2 in the example of FIG. 5, and may be used to determine candidate motion vectors for both merge and AMVP mode. Let certain symbols be defined as follows:

A luma location (xP, yP) is used to specify the top-left luma sample of the current prediction unit (PU) 90 relative to the top-left sample of the current picture;
Variables nPSW and nPSH denote the width and the height of the PU for luma;
The top-left luma sample of the current prediction unit N relative to the top-left sample of the current picture is (xN, yN).

Given these example definitions, (xN, yN) (with N being replaced by $A_0, A_1, B_0, B_1$, or $B_2$, per FIG. 5) may be defined as (xP−1, yP+nPSH), (xP−1, yP+nPSH−1), (xP+nPSW, yP−1), (xP+nPSW−1, yP−1) or (xP−1, yP−1), respectively. In some examples, illumination compensation can be used when motion information for a PU is predicted using merge mode. FIG. 5 illustrates motion vector predictor candidates that may be used during merge mode coding of motion information for a PU.

Figure 6:
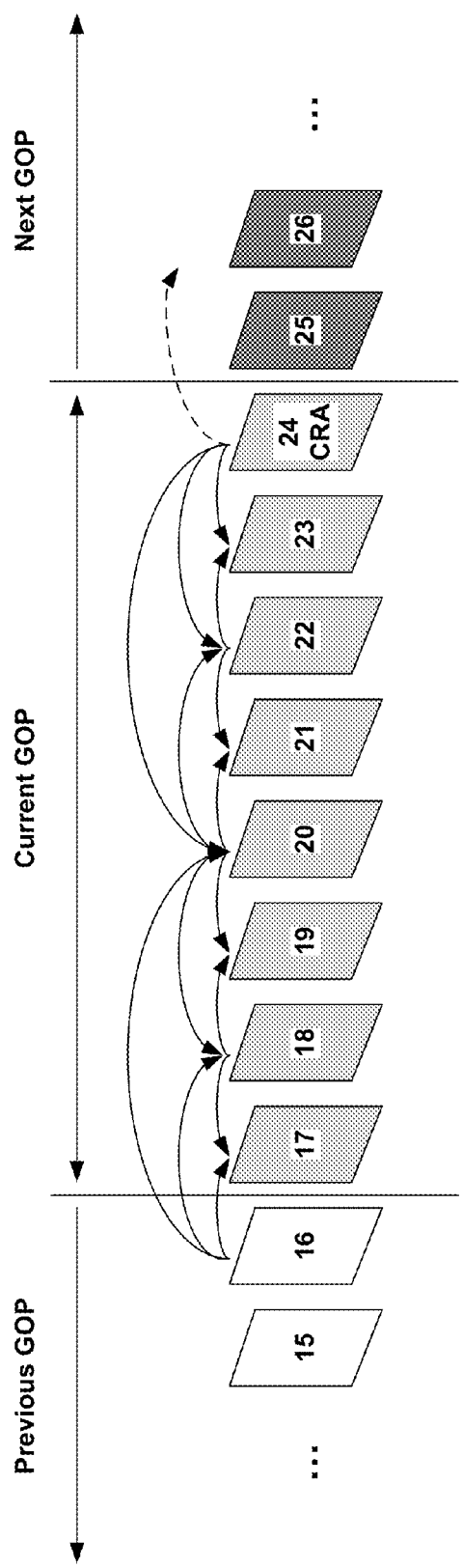
FIG. 6 is a conceptual diagram illustrating a prediction structure of video frames in output order.

FIG. 6 is a conceptual diagram illustrating a prediction structure of video frames in output order. There are four picture types that can be identified by a network abstraction layer (NAL) unit type in HEVC. These are the instantaneous decoding refresh (IDR) picture, the clean random access (CRA) picture, the temporal layer access (TLA) picture, and a coded picture that is not an IDR, CRA, or TLA picture. In some examples, illumination compensation can be used when a block is included in an IRAP picture, such as an IDR or CRA picture.

The IDR picture and the coded pictures are picture types inherited from the H.264/AVC specification. The CRA and the TLA picture types are new in HEVC and not available in the H.264/AVC specification. The CRA picture is a picture type that facilitates decoding beginning from any random access point in the middle of a video sequence, which is more efficient than inserting IDR pictures. In HEVC, a bitstream starting from these CRA pictures is also a conforming bitstream. The TLA picture is a picture type that can be used to indicate valid temporal layer switching points.

In video applications, such as broadcasting and streaming, an important feature for users to switch between different channels and to jump to specific parts of the video with minimum delay is needed. This feature is enabled by having random access pictures at regular intervals in the video bitstreams. The IDR picture, specified in both H.264/AVC and HEVC, can be used for random access. However, since an IDR picture starts a coded video sequence and always cleans the decoded picture buffer (DPB), pictures following the IDR in decoding order cannot use pictures decoded prior to the IDR picture as reference. Consequently, bitstreams relying on IDR pictures for random access can have significantly lower coding efficiency (e.g., 6%). To improve the coding efficiency, CRA pictures in HEVC allow pictures that follow the CRA picture in decoding order but proceed the CRA picture in output order to use pictures decoded before the CRA picture as reference.

A typical prediction structure around a CRA picture is shown in FIG. 6: the CRA picture (with a POC value of 24) belongs to a Group of Pictures (GOP), which contains other pictures (POC values 17 through 23), following the CRA picture in decoding order but preceding the CRA picture in output order. These pictures are called leading pictures of the CRA picture and can be correctly decoded if the decoding starts from an IDR or CRA picture before the current CRA picture. However, leading pictures cannot be correctly decoded when random access from this CRA picture occurs; hence, these leading pictures are typically discarded during the random access decoding.

To prevent error propagation from reference pictures that may not be available depending on where the decoding starts, all pictures in the next GOP, as shown in FIG. 6, that follow the CRA picture both in decoding order and output order, shall not use any picture that precedes the CRA picture either in decoding order or output order (which includes the leading pictures) as reference.

Similar random access functionalities are supported in H.264/AVC with the recovery point SEI message. An H.264/AVC decoder implementation may or may not support the functionality. In HEVC, a bitstream starting with a CRA picture is considered as a conforming bitstream. When a bitstream starts with a CRA picture, the leading pictures of the CRA picture may refer to unavailable reference pictures and hence cannot be correctly decoded. However, HEVC specifies that the leading pictures of the starting CRA picture are not output, hence the name "clean random access." For establishment of the bitstream conformance requirement, HEVC specifies a decoding process to generate unavailable reference pictures for decoding of the non-output leading pictures. However, conforming decoder implementations do not have to follow that decoding process, as long as it can generate identical output compared to when the decoding process is performed from the beginning of the bitstream. In HEVC, a conforming bitstream may contain no IDR pictures at all, and consequently, may contain a subset of a coded video sequence or an incomplete coded video sequence.

Besides the IDR and CRA pictures, there are other types of random access point pictures, e.g., broken link access (BLA). For each of the major types of the random access point pictures, there may be sub-types, depending on how a random access point picture could be potentially treated by systems. Each sub-type of random access point picture has a different network abstraction layer (NAL) unit type.

An TRAP (intra random access point) picture is also defined in HEVC, i.e., a coded picture for which each VCL NAL unit has nal_unit_type in the range of BLA_W_LP to RSV_IRAP_VCL23, inclusive. An IRAP picture contains only I slices, and may be a BLA picture, a CRA picture, or an IDR picture. The first picture in the bitstream in decoding order must be an IRAP picture. Provided the necessary parameter sets are available when they need to be activated, the TRAP picture and all subsequent non-RASL pictures in decoding order can be correctly decoded without performing the decoding process of any pictures that precede the IRAP picture in decoding order. There may be pictures in a bitstream that contain only I slices that are not IRAP pictures.

Figure 7:
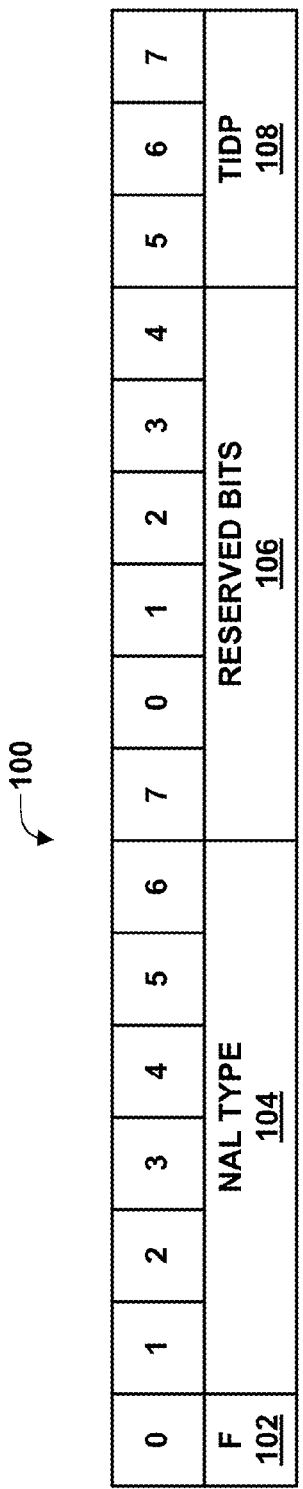
FIG. 7 is a conceptual diagram of a network abstraction layer (NAL) unit header in accordance with High Efficiency Video Coding (HEVC).

FIG. 7 is a conceptual diagram of a NAL unit header 100 in accordance with HEVC. In HEVC, a two-byte NAL unit header was introduced with the anticipation that this design is sufficient to support the HEVC scalable and 3D Video Coding (3DV) extensions, as well as other future extensions, as briefly described below.

As shown in FIG. 7, the first byte of the HEVC NAL unit header is similar to H.264/AVC NAL unit header. In particular, NAL unit header 100 includes F-bit 102, NAL unit type field 104, reserved bits 106, and temporal identifier plus one (TIDP) field 108.

The forbidden_zero (F) bit 102 must have a value of zero, to prevent start code emulations in MPEG-2 systems legacy environments.

In H.264/AVC, the nal_ref_idc (NRI) was a two bit fixed code word. The main motivation for two bits was the support of different transport priority signaling to support data partitioning. The removal of data partitioning allowed the NRI to be reduced by one 1-bit for HEVC. Furthermore, NAL unit types may be used to indicate whether certain reference pictures are enabled for the NAL unit. So, NRI is completely removed from the NAL unit header in HEVC, which, in turn, allows the size of the nal_unit_type (represented as NAL type field 104 in FIG. 7) to increase from five to six bits, providing for twice as many NAL unit types, compared with H.264/AVC.

The second part of the HEVC NAL unit header includes two syntax elements: reserved_zero_6 bits (represented by reserved bits 106 in FIG. 7, which includes 6 bits) temporal_id_plus 1 (TIDP field 108 in FIG. 7, which includes 3 bits). TIDP field 108 can be used to support temporal scalability (with the temporal identifier ranging from 0 to 6 inclusive). Video coding layer (VCL) NAL units with can be decoded successfully without accessing any NAL units that have larger TemporalId values.

A current picture, when being decoded, has a reference picture set including all the pictures that may be used either by the current picture or the picture following (future) the current picture for reference. A video coding device can distinguish between pictures that can be used as reference for the current picture and pictures that can only be used as reference pictures for a future picture. Reference picture lists are constructed based on the pictures in the reference picture set that can be used for the current picture (namely "RPS for current"), and thus, not the pictures that can only be used as references for future pictures. A picture in a current RPS may or may not be in any of the two reference picture lists, RefPicList0 or RefPicList1.

Currently, a Joint Collaboration Team on 3D Video Coding (JCT-3C) of VCEG and MPEG is developing a 3DV standard based on HEVC, for which part of the standardization efforts includes the standardization of the multiview video codec based on HEVC (MV-HEVC) and another part for 3D Video coding based on HEVC (3D-HEVC). For 3D-HEVC, new coding tools, including those in coding unit/prediction unit level, for both texture and depth views may be included and supported. Version 7.0 of the 3D-HTM software for 3D-HEVC can be downloaded from the following link: https://hevc.hhi.fraunhofer.de/svn/svn_3DVCSoftware/tags/HTM-7.0/. This software is described, along with a working draft of 3D-HEVC, in Gerhard Tech, Krzysztof Wegner, Ying Chen, Sehoon Yea, "3D-HEVC Test Model 4," JCT3V-D1005, Joint Collaborative Team on 3D Video Coding Extension Development of ITU-T SG 16 WP 3 and ISO/IEC JTC 1/SC 29/WG 11, 3rd Meeting: Incheon, KR, Apr. 2013, available at http://phenix.it-sudparis.eu/jct2/doc_end_user/documents/4_Incheon/wg11/JCT3V-D1005-v1.zip.

Figure 8:
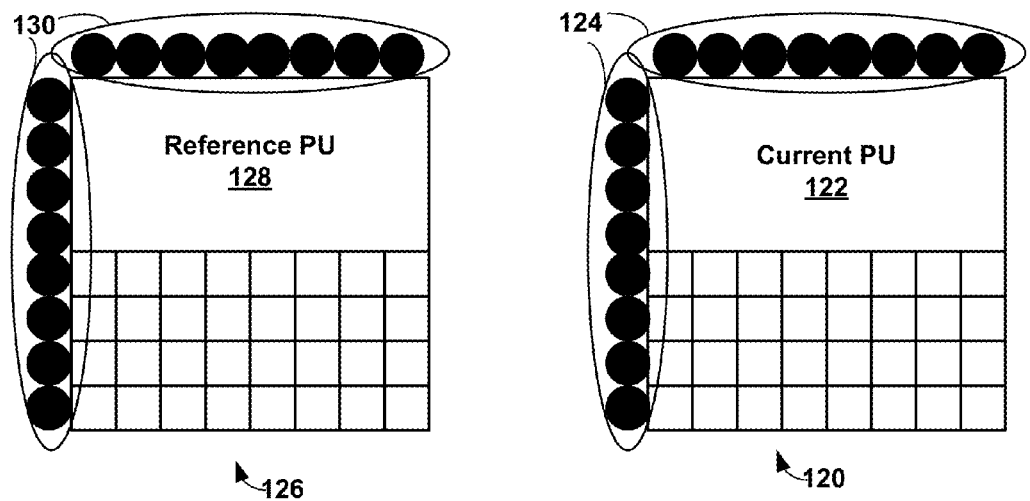
FIG. 8 is a conceptual diagram illustrating neighboring samples that may be used for the derivation of illumination compensation parameters.
Figure 8:
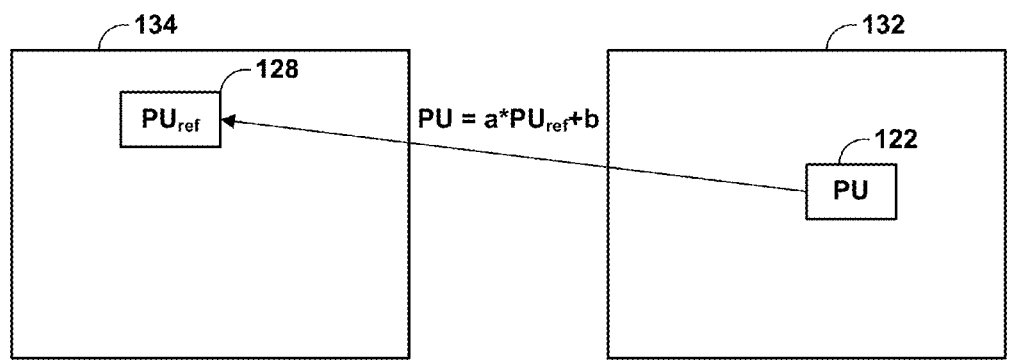

FIG. 8 is a conceptual diagram illustrating neighboring samples that may be used for the derivation of illumination compensation parameters. In particular, FIG. 8 illustrates current coding unit (CU) 120, which includes current PU 122, and reference CU 126, which includes reference PU 128. FIG. 8 also illustrates neighboring samples (pixels) 124 to current CU 120, as well as neighboring samples 130 to reference CU 126.

Illumination compensation (IC) in multi-view video coding may be used for compensating illumination discrepancy between different views, because each camera may have different exposure to a light source. Typically, a weight factor and/or an offset are used to compensate the differences between a coded block and a prediction block in a different view. The parameters may or may not be explicitly transmitted to a decoder.

Illumination compensation is described in Liu et al., "3D-CE2.h: Results of Illumination Compensation for Inter-View Prediction," Joint Collaborative Team on 3D Video Coding Extension Development of ITU-T SG 16, WP 3 and ISO/IEC JTC 1/SC 29/WG 11, JCT3V-B0045, Shanghai, Conn., 13-19 Oct. 2012, available at http://phenix.it-sudparis.eu/jct2/doc_end_user/current_document.php?id=234. In JCT3V-B0045, illumination compensation is signalled in the coding unit level and the parameters are derived from neighboring samples 124 to current CU 120 and neighboring samples 130 to reference CU 126. Later, the signalling of the mode was changed, as described in Ikai, "3D-CE5.h related: Removal of parsing dependency in illumination compensation," Joint Collaborative Team on 3D Video Coding Extension Development of ITU-T SG 16, WP 3 and ISO/IEC JTC 1/SC 29/WG 11, JCT3V-D0060, Incheon, KR, 20-26 Apr., 2013, available at http://phenix.it-sudparis.eu/jct2/doc_end_user/current_document.php?id=744.

Therefore, illumination compensation was introduced to improve the coding efficiency for blocks predicted from inter-view reference pictures. This mode may only apply to blocks that are predicted using an inter-view reference picture.

Neighboring samples 124 include samples (pixels) in the top neighboring row and left neighboring column to CU 120. Neighboring samples 124, together with the corresponding neighboring samples 130 to reference CU 126, may be used as input parameters for a linear model, which may derive a scaling factor a and an offset b by a least squares solution. The corresponding neighboring samples 130 in the reference view may be identified by a disparity motion vector of the current PU, as shown in FIG. 8. In particular, FIG. 8 illustrates a current picture 132 in a non-base-view that includes PU 122 and base view picture 134 that includes reference PU 128 (labeled "PUref" within base view picture 134 of FIG. 8).

After motion compensation from an inter-view reference, a video coder (e.g., video encoder 20 or video decoder 30) may apply the linear model to each value of reference block 128 to update the prediction signal for current PU 122. Each value of the reference block may be further scaled by a and further added to b, as shown in FIG. 8. That is, each sample value (pixel value) of reference PU 128 may be modified according to the formula "a*(sample value of reference PU 128)+b." AMVP and merge modes in illumination compensation can be adaptively enabled or disabled in a slice level so as to reduce extra bits and unnecessary computations.

The enabling of illumination compensation (IC) may be signalled in a slice header by a flag, e.g., slice_ic_enable_flag. Similar to other flags, if the slice_ic_enable_flag is equal to 0, the IC mode is disabled for all CUs of the slice; otherwise, a CU may or may not use this mode, depending on the flag (ic_flag) signalled in the CU-level.

In one design, proposed in JCT3V-B0045 as cited above, the ic_flag is only signaled when a CU has at least one PU that is predicted from an inter-view reference picture from RefPicList0 or RefPicList1. However, the condition requires derivation of all reference indices of the PUs in a CU. This requires parsing of all PU syntax elements and completion of the merge candidate list construction for each PU coded with merge mode. In general, a delay of parsing, especially based on a decoding process (e.g., on merge candidate list construction), is not desirable in a video codec.

Therefore, the IC mode signalling has been modified, as proposed in JCT3V-D0060, cited above. The modifications of JCT3V-D0060 include two parts: the disabling of IC mode for CUs coded with a partition size other than 2N×2N and an additional flag slice_ic_disable_merge_zero_idx_flag in slice header, controlling whether the flag indicating the IC mode is signalled or not in special cases concerning the merge mode. Per JCT3V-D0060, the ic_flag is always signaled after the merge_flag (indicating the current inter predicted PU is coded with merge or AMVP).

Likewise, per JCT3V-D0060, when the current PU (coded with 2N×2N) is coded with merge mode, the ic_flag is only signaled when slice_ic_disable_merge_zero_idx_flag is equal to 0 or the merge index is not equal to 0. Furthermore, per JCT3V-D0060, when the current PU (coded with 2N×2N) is coded with AMVP mode, the reference indices corresponding to RefPicList0 and RefPicList1 are known. Per JCT3V-D0060, only when either of them corresponds to an inter-view reference picture, the ic_flag is signalled.

Note that ic_flag may be simply replaced by checking whether the current picture is a random access picture or not, as per the techniques described in U.S. Provisional Application No. 61/842,834, filed Jul. 3, 2013.

Figure 9:
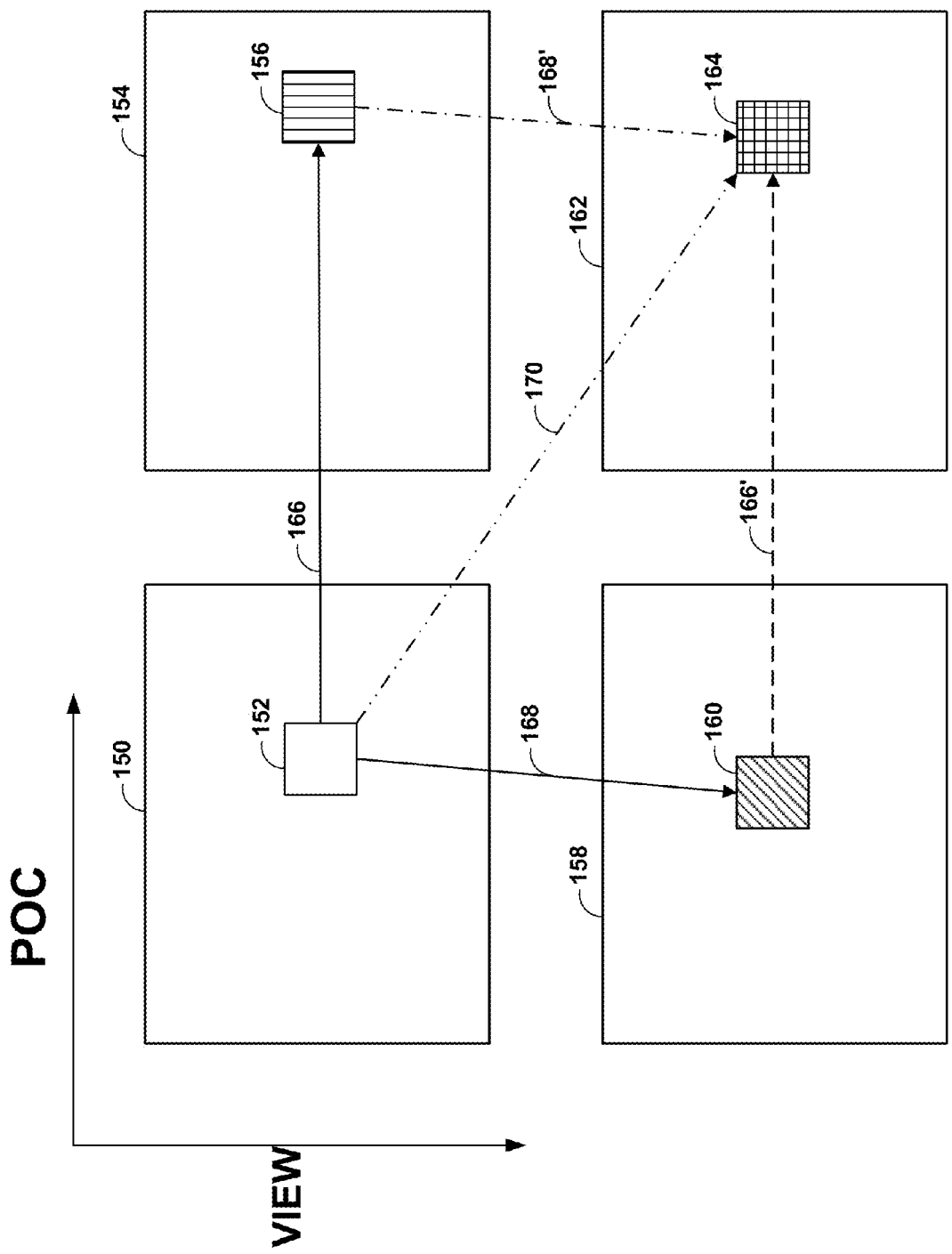
FIG. 9 is a conceptual diagram illustrating techniques for advanced residual prediction (ARP).

FIG. 9 is a conceptual diagram illustrating techniques for advanced residual prediction (ARP). Advanced residual prediction (ARP) may be applied to CUs with partition mode equal to Part_2N×2N was adopted in the 4th JCT3V meeting, as proposed in Zhang et al., "CE4: Advanced residual prediction for multiview coding," JCT3V-D0177, 20-26 Apr., 2013, available at http://phenix.it-sudparis.eu/jct3 v/doc_end_user/current_document.php?id=862t.

FIG. 9 illustrates the prediction structure of ARP in multiview video coding. As shown in FIG. 9, the following blocks are invoked in the prediction of the current block:
1. A current block 152 of a current picture 150
2. A reference block 160 in reference/base view picture 158 derived by disparity vector (DV) 168
3. A block 156 of picture 154 in the same view as current block 152 derived by temporal motion vector 166 (denoted as TMV) of the current block.
4. A block 164 of picture 162 in the same view as reference block 160, derived by applying temporal motion vector 166 of current block 152 to reference block 160. Block 164 is identified by a vector 170 resulting from combining temporal motion vector 166 and disparity vector 168, relative to current block 152.

The residual predictor is denoted as: BaseTRef-Base (that is, block 164 minus block 160), wherein the subtraction operation applies to each pixel of the denoted pixel arrays. A weighting factor w is further multiplied to the residual predictor. Therefore, the final predictor of the current block is denoted as: CurrTRef+w*(BaseTRef-Base), i.e., block 156+w*(block 164–block 160). The weighting factor, w, may have a value of, e.g., 0.5 or 1.0.

It should be understood that temporal motion vectors 166 and 166' are equal in value, but applied to different blocks. In this example, temporal motion vector 166 is applied to block 152 to identify reference block 156, while temporal motion vector 166' may be applied to block 160 to identify block 164. Similarly, disparity vectors 168 and 168' are equal in value but applied to different blocks. In this example, disparity vector 168 may be applied to block 152 to identify block 160, while disparity vector 168' may be applied to block 156 to identify block 164.

Figure 10:
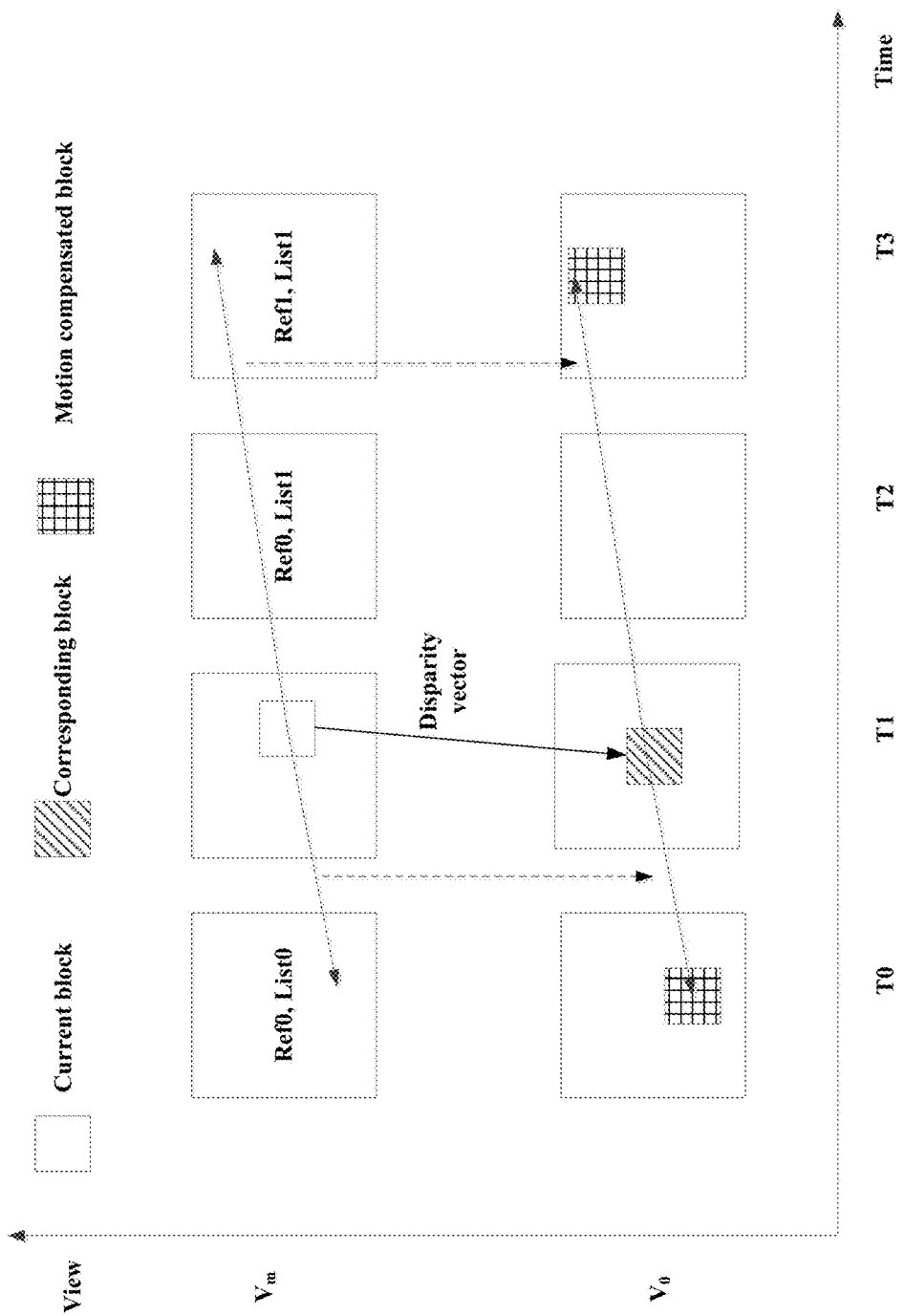
FIG. 10 is a conceptual diagram illustrating a relationship among a current block, reference blocks, and motion compensated blocks in the case of bi-directional prediction.

FIG. 10 is a conceptual diagram illustrating a relationship among a current block, reference blocks, and motion compensated blocks in the case of bi-directional prediction. The above description of FIG. 9 is based on the assumption that uni-directional prediction is applied. When extended to the case of bi-directional prediction, as shown in FIG. 10, the above steps described with respect to FIG. 9 may be applied for each reference picture list. When the current block uses an inter-view reference picture (in a different view) for one reference picture list, the residual prediction process may be disabled.

The main procedures of the proposed ARP at the decoder side can be described as follows:
1. Obtain a disparity vector as specified in the current 3D-HEVC, pointing to a target reference view. Then, in the picture of the reference view within the same access unit, the corresponding block is located by the disparity vector.
2. Re-use the motion information of the current block to derive the motion information for the reference block. Apply motion compensation for the corresponding block based the same motion vector of current block and derived reference picture in the reference view for the reference block, to derive a residue block. The relationship among the current block, the corresponding block and the motion compensated block is shown in FIG. 4. The reference picture in the reference view (V0) which has the same POC (Picture Order Count) value as the reference picture of current view (Vm) is selected as the reference picture of the corresponding block.
3. Apply the weighting factor to the residue block to get a weighted residue block and add the values of the weighted residue block to the predicted samples.

In one example, three weighting factors are used in ARP: 0, 0.5, and 1. A video encoder, e.g., video encoder 20, may select the weighting factor that leads to a minimal rate-distortion cost for the current CU as the final weighting factor and the corresponding weighting factor index (e.g., 0, 1 and 2, which may correspond to weighting factor 0, 1, and 0.5, respectively) may be transmitted in the bitstream at the CU level. All PU predictions in one CU may share the same weighting factor. When the weighting factor is equal to 0, ARP is not used for the current CU.

In Zhang et al., "3D-CE4: Advanced residual prediction for multiview coding," JCT3V-00049, Geneva, Switzerland, 17-23 Jan., 2013, available at http://phenix.int-evry.fr/jct3v/doc_end_user/current_document.php?id=487, the reference pictures of prediction units coded with non-zero weighting factors may be different from block to block. Therefore, different pictures from the reference view may need to be accessed to generate the motion-compensated block (block 164 in FIG. 9) of the corresponding block. JCT3V-00049 proposed to scale the decoded motion vectors of the current PU towards a fixed picture before performing motion compensation for the residual generation process, when the weighting factor is not equal to 0.

In JCT3V-D0177, the fixed picture is defined as the first reference picture of each reference picture list if it is from the same view. When the decoded motion vector does not point to the fixed picture, the motion vector is first scaled and then used to identify CurrTRef and BaseTRef. Such a reference picture used for ARP is referred to as the target ARP reference picture.

In JCT3V-00049, a bi-linear filter is applied during the interpolation process of the corresponding block and its prediction block. For the prediction block of the current PU in the non-base views, a conventional 8/4-tap filter is applied. JCT3V-D0177 proposed to always employ the bi-linear filter, regardless of whether the block is in a base view or a non-base view, when ARP is applied.

The reference view is identified by the view order index returned from the NBDV process. In the design of ARP in 3D-HTM version 7.0, when the reference picture of one PU in one reference picture list is from a different view of the current view, ARP is disabled for this reference picture list.

Figure 11:
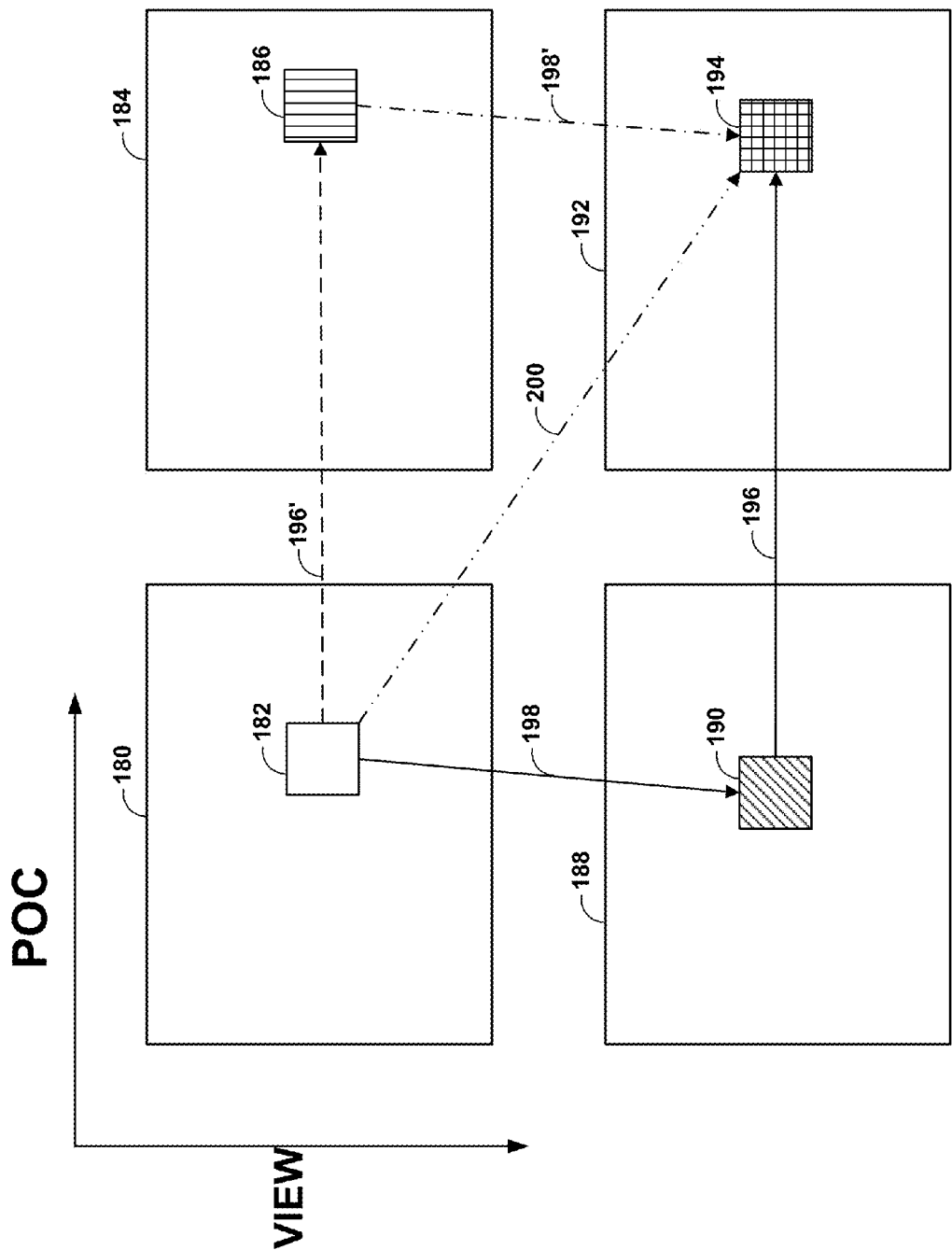
FIG. 11 is a conceptual diagram illustrating further improvements of ARP.

FIG. 11 is a conceptual diagram illustrating further improvements of ARP. ARP as described in JCT3V-D0177 could be only applied to temporal prediction, i.e., the current motion vector of a current block refers to a reference picture in the same view. In U.S. Provisional Applications 61/838, 208, filed Jun. 21, 2013, and 61/846,036, filed Jul. 14, 2013, solutions to apply ARP for inter-view prediction (i.e., the current motion vector of a current block refers to a reference picture in a different view) were described. Per these two provisional applications:

It is proposed in ARP, the inter-view residual calculated in a different access unit can be used to predict the residual of the current block, as shown in [FIG. 11]. When the motion vector of the current block (Curr) is a disparity motion vector (DMV), and the reference block in the reference view (Base) (identified by the DMV) contains at least one temporal motion vector, a temporal motion vector of the reference block in the reference view (Base) together with the DMV is used to identify a temporal reference block in the reference view (BaseTRef) and the temporal motion vector is used to identify a temporal reference block in the current view (CurrTRef). Therefore, the inter-view residual predictor in a different access unit can be calculated as the difference between these two latter blocks: CurrTRef-BaseTRef. The difference signal, denoted as the inter-view residual predictor, can be used to predict the residual of the current block. The prediction signal of the current block is the sum of the inter-view predictor (Base) and the predicted inter-view residual in a different access unit, with a weighting factor w: Base+w*(CurrTRef-BaseTRef).

More particularly, FIG. 11 illustrates current picture 180 including current block 182, picture 184 including block 186, picture 188 in a different view that includes block 190, and picture 192 including block 194. In the example of FIG. 11, block 190 may be used as a reference block for current block 182, as indicated by disparity motion vector 198. Block 190 may further include data for temporal motion vector 196 that identifies block 194 as a reference block for block 190. Temporal motion vector 196 may be applied to current block 182 (temporal motion vector 196') to identify block 186. A residual (pixel-by-pixel difference) between block 186 and block 194, to which a weighting factor may be applied, may be used as a residual predictor for current block 182. In other words, a predictor for current block 182 may equal block 190+w*(block 186−block 194), where the predictor and blocks refer to the pixel samples of the predictor and blocks.

Table 5 below describes a video parameter set extension, including illumination compensation and ARP related syntax elements. Semantics for relevant syntax elements of each of Tables 5-7 below are provided below Table 7.

TABLE 5

| vps_extension2( ) { | Descriptor |
|---|---|
| while( !byte_aligned( ) ) | |
|   vps_extension_byte_alignment_reserved_one_bit | u(1) |
| for( i = 0; i <= vps_max_layers_minus1; i++ ) { | |
|   layerId = layer_id_in_nuh[ i ] | |
|   view_id[ layerId ] | u(8) |
|   if( layerId != 0 ) { | |
|     if ( !VpsDepthFlag[ layerId ] ) { | |
|       iv_mv_pred_flag[ layerId ] | u(1) |
|       iv_res_pred_flag[ layerId ] | u(1) |
|       depth_refinement_flag[ layerId ] | u(1) |
|       view_synthesis_pred_flag[ layerId ] | u(1) |
|     } else { | |
|       vps_depth_modes_flag[ layerId ] | u(1) |
|       lim_qt_pred_flag[ layerId ] | u(1) |
|       if( vps_depth_modes_flag[ layerId ] | |
|         dlt_flag[ layerId ] | u(1) |
|       if( dlt_flag[ layerId ] ) { | |
|         num_depth_values_in_dlt[ layerId ] | ue(v) |
|         for ( j = 0; j < num_depth_values_in_dlt[ layerId ]; j++) { | |
|           dlt_depth_value[ layerId ][ j ] | ue(v) |
|         } | |
|       } | |
|     } | |
|   } | |
| } | |
| iv_mv_scaling_flag | u(1) |
| } | |

Table 6 below describes general slice header syntax elements.

TABLE 6

| slice_header( ) { | Descriptor |
|---|---|
| first_slice_in_pic_flag | u(1) |
| if( RapPicFlag ) | |
|   no_output_of_prior_pics_flag | u(1) |
| pic_parameter_set_id | ue(v) |
| ... | |
|   if( ( weighted_pred_flag && slice_type = = P) \|\| | |
|     ( weighted_bipred_flag && slice_type = = B ) ) | |
|     pred_weight_table( ) | |
|   else if( layer_id ) { | |
|     slice_ic_enable_flag | u(1) |
|     slice_ic_disable_merge_zero_idx_flag | u(1) |
|   } | |
|   five_minus_max_num_merge_cand | ue(v) |
| } | |

Table 7 below describes general coding unit syntax elements.

TABLE 7

| coding_unit( x0, y0, log2CbSize , ctDepth) { | Descriptor |
|---|---|
|   if( transquant_bypass_enable_flag ) { | |
|     cu_transquant_bypass_flag | ae(v) |
|   } | |
|   if( slice_type != I ) | |
|     skip_flag[ x0 ][ y0 ] | ae(v) |
|   if( skip_flag[ x0 ][ y0 ] ) { | |
|     prediction_unit( x0, y0, log2CbSize ) | |
|     if ( iv_res_pred_flag && TempRefPicInListsFlag ) | |
|       iv_res_pred_weight_idx | ae(v) |
|     if ( icEnableFlag ) | |
|       ic_flag | ae(v) |
|   } | |
|   else { | |
|     nCbS = ( 1 << log2CbSize ) | |
|     if( slice_type != I ) | |
|       pred_mode_flag | ae(v) |
|     if( ( PredMode[ x0 ][ y0 ] ! = MODE_INTRA \|\| log2CbSize = = Log2MinCbSize ) && | |
|     !predPartModeFlag) | |
|       part_mode | ae(v) |
|     if( PredMode[ x0 ][ y0 ] = = MODE_INTRA ) { | |
|       if( PartMode = = PART_2N×2N && pcm_enabled_flag && | |
|         log2CbSize >= Log2MinIPCMCUSize && | |
|         log2CbSize <= Log2MaxIPCMCUSize ) | |
|         pcm_flag | ae(v) |
|       if( pcm_flag ) { | |
|         num_subsequent_pcm | tu(3) |
|         NumPCMBlock = num_subsequent_pcm + 1 | |
|         while( !byte_aligned( ) ) | |
|           pcm_alignment_zero_bit | f(1) |
|         pcm_sample( x0, y0, log2CbSize ) | |
|       } else { | |
|         pbOffset = ( PartMode = = PART_N×N ) ? ( nCbS / 2 ) : 0 | |
|         log2PbSize = log2CbSize − ( PartMode = = PART_N×N ? 1 : 0 ) | |
|         for( j = 0; j <= pbOffset; j = j + pbOffset ) | |
|           for( i = 0; i <= pbOffset; i = i + pbOffset ) { | |
|             if( vps_depth_modes_flag[ nuh_layer_id ] ) | |
|               depth_mode_parameters( x0 + i , y0+ j ) | |
|             if( depth_intra_mode[ x0 + i ][ y0 + j ] = = INTRA_DEP_NONE ) | |
|               prev_intra_luma_pred_flag[ x0 + i ][ y0+ j ] | ae(v) |
|           } | |
|         for( j = 0; j <= pbOffset; j = j + pbOffset ) | |
|           for( i = 0; i <= pbOffset; i = i + pbOffset ) { | |
|             if( depth_intra_mode[ x0 + i ][ y0 + j ] = = INTRA_DEP_NONE) | |
| { | |
|             if( prev_intra_luma_pred_flag[ x0 + i ][ y0+ j ] ) | |
|               mpm_idx[ x0 + i ][ y0+ j ] | ae(v) |
|             else | |
|               rem_intra_luma_pred_mode[ x0 + i ][ y0+ j ] | ae(v) |
|           } | |
|         } | |
|         if ( !SdcFlag[ x0 ][ y0 ] ) | |
|           intra_chroma_pred_mode[ x0 ][ y0 ] | ae(v) |
|       } | |
|     } else { | |
|       if( PartMode = = PART_2N×2N ) { | |
|         if ( iv_res_pred_flag && TempRefPicInListsFlag ) | |
|           iv_res_pred_weight_idx | ae(v) |
|         prediction_unit( x0, y0, nCbS, nCbS ) | |
|       } else if( PartMode = = PART_2N×N ) { | |
|         prediction_unit( x0, y0, nCbS, nCbS / 2 ) | |
|         prediction_unit( x0, y0 + ( nCbS / 2 ), nCbS, nCbS / 2 ) | |
|       } else if( PartMode = = PART_N×2N ) { | |
|         prediction_unit( x0, y0, nCbS / 2, nCbS ) | |
|         prediction_unit( x0 + ( nCbS / 2 ), y0, nCbS / 2, nCbS ) | |
|       } else if( PartMode = = PART_2N×nU ) { | |
|         prediction_unit( x0, y0, nCbS, nCbS / 4 ) | |
|         prediction_unit( x0, y0 + ( nCbS / 4 ), nCbS, nCbS *3 / 4 ) | |
|       } else if( PartMode = = PART_2N×nD ) { | |
|         prediction_unit( x0, y0, nCbS, nCbS *3 / 4 ) | |
|         prediction_unit( x0, y0 + ( nCbS * 3 / 4 ), nCbS, nCbS / 4 ) | |
|       } else if( PartMode = = PART_nL×2N ) { | |
|         prediction_unit( x0, y0, nCbS /4, nCbS ) | |
|         prediction_unit( x0 + ( nCbS / 4 ), y0, nCbS *3 / 4, nCbS) | |
|       } else if( PartMode = = PART_nR×2N ) { | |
|         prediction_unit( x0, y0, nCbS *3 / 4, nCbS ) | |
|         prediction_unit( x0 + ( nCbS * 3 / 4 ), y0, nCbS / 4, nCbS ) | |
|       } else { /* PART_N×N */ | |

TABLE 7-continued

| coding_unit( x0, y0, log2CbSize , ctDepth) { | Descriptor |
|---|---|
|       prediction_unit( x0, y0, nCbS / 2, nCbS / 2) | |
|       prediction_unit( x0 + ( nCbS / 2 ), y0, nCbS / 2, nCbS / 2 ) | |
|       prediction_unit( x0, y0 + ( nCbS / 2 ), nCbS / 2, nCbS / 2 ) | |
|    prediction_unit( x0 + ( nCbS / 2 ), y0 + ( nCbS / 2 ), nCbS / 2, nCbS / 2 ) | |
|     } | |
|   } | |
|   if ( icEnableFlag ) | |
|     ic_flag | ae(v) |
|   if( !pcm_flag ) { | |
|     if( PredMode[ x0 ][ y0 ] != MODE_INTRA && | |
|      !(PartMode == PART_2N×2N && merge_flag[x0][y0]) ) | |
|      no_residual_syntax_flag | ae(v) |
|     if( !no_residual_syntax_flag ) { | |
|      MaxTrafoDepth = ( PredMode[ x0 ][ y0 ] == MODE_INTRA ? | |
|                max_transform_hierarchy_depth_intra + IntraSplitFlag : | |
|                max_transform_hierarchy_depth_inter ) | |
|      transform_tree( x0, y0 x0, y0, log2CbSize, 0, 0 ) | |
|     } | |
|   } | |
| } | |

Example semantics for certain relevant syntax elements of Tables 5-7 are described below. It should be understood that these semantics are examples, and may be defined in a different manner in other examples. For instance, semantics for values of 0 and 1 may be swapped. Likewise, the inferential values may be modified.

iv_res_pred_flag[layerId] indicates whether inter-view residual prediction is used in the decoding process of the layer with nuh_layer_id equal to layerId. iv_res_pred_flag [layerId] equal to 0 specifies that inter-view residual prediction is not used for the layer with nuh_layer_id equal to layerId. iv_res_pred_flag[layerId] equal to 1 specifies that inter-view residual prediction may be used for the layer with nuh_layer_id equal to layerId. When not present, the value of iv_res_pred_flag[layerId] shall be inferred to be equal to 0.

iv_res_pred_weight_idx specifies the index of the weighting factor used for residual prediction. ivres_pred_weight_idx equal to 0 specifies that residual prediction is not used for the current coding unit. iv_res_pred_weightidx not equal to 0 specifies that residual prediction is used for the current coding unit. When not present, the value of iv_res_pred_weight_idx is inferred to be equal to 0.

The variable icEnableFlag is set equal to 0 and when slice_ic_enable_flag is equal to 1 and PartMode is equal to 2N×2N and PredMode[x0][y0] is not equal to MODE_INTRA, the following applies:

If merge_flag[x0][y0] is equal to 1, the following applies:

icEnableFlag=(merge_idx[x0][y0]!=0)||!slice_ic_disable_merge_zero_idx_flag       (H-9)

Otherwise (merge_flag[x0][y0] is equal to 0), the following applies:

With X being replaced by 0 and 1, the variable refViewIdxLX is set equal to the view order index of RefPicListLX[ref_idx_lX[x0][y0] ].

The flag icEnableFlag is derived as specified in the following:

icEnableFlag=(inter_pred_idc[x0][y0]!=Pred_L0&& refViewIdxL1[x0][y0]!=ViewIdx)||(inter_pred_idc[x0][y0]!=Pred_L1&& refViewIdxL0[x0][y0]!=ViewIdx)       (H-10)

ic_flag equal to 1 specifies illumination compensation is used for the current coding unit. ic_flag equal to 0 specifies illumination compensation is not used for the current coding unit. When not present, ic_flag is inferred to be equal to 0.

sliceic_enable_flag equal to 1 specifies illumination compensation is enabled for the current slice. slice_ic_enable_flag equal to 0 specifies that illumination compensation is disabled for the current slice. When not present, slice_ic_enable_flag is inferred to be equal to 0.

sliceic_disable_merge_zero_idx_flag equal to 1 specifies that ic_flag is not present in the coding units of the current slice when merge_flag is equal to 1 and merge_idx of the first prediction unit of the coding unit is equal to 0. slice_ic_disable_merge_zero_idx_flag equal to 0 specifies that ic_flag might be present in the coding units of the current slice when merge_flag is equal to 1 and merge_idx of the first prediction unit of the coding unit is equal to 0. When not present, slice_ic_disable_merge_zero_idx_flag is inferred to be equal to 0.

Figure 12:
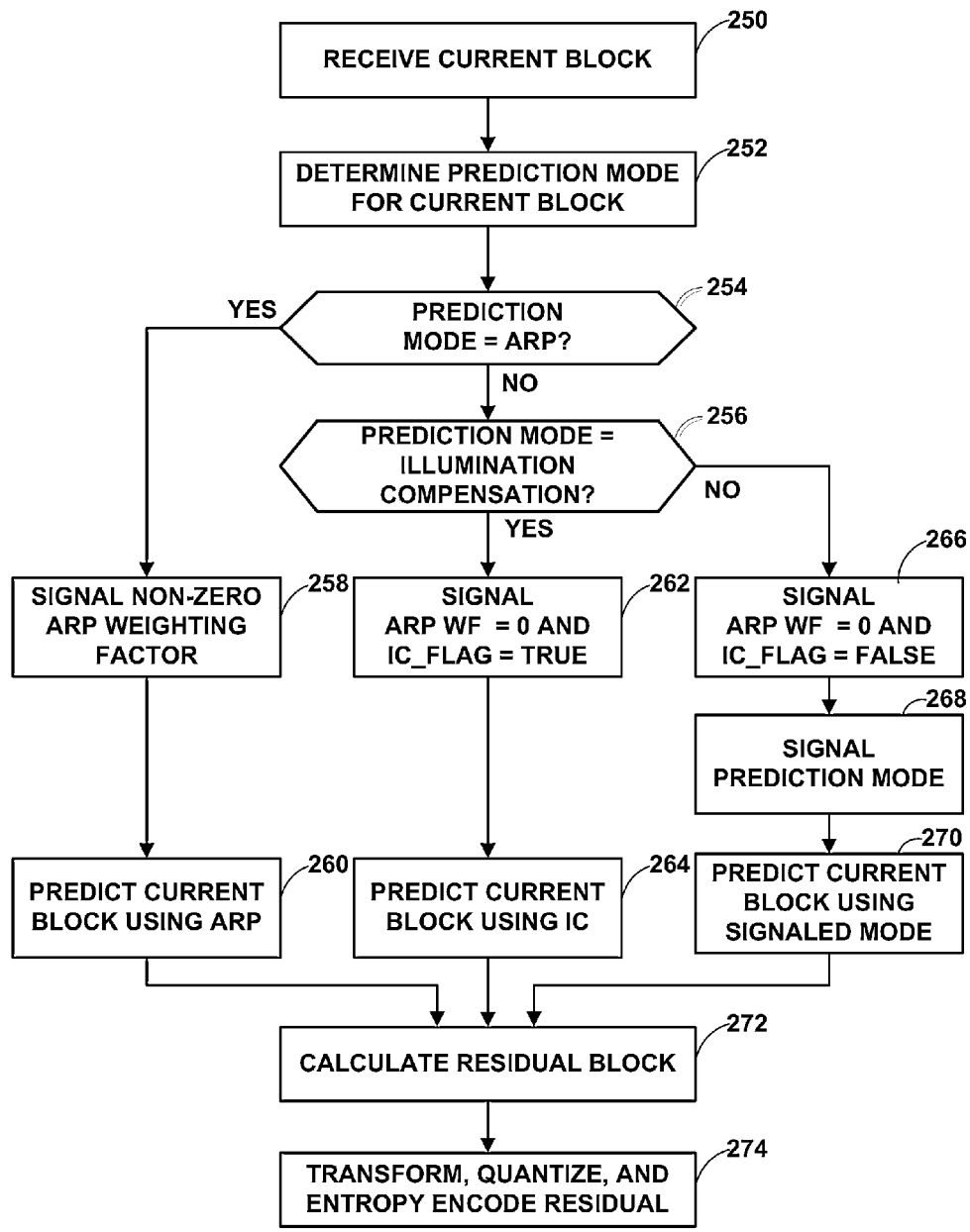
FIG. 12 is a flowchart illustrating an example method for encoding a block in accordance with the techniques of this disclosure.

FIG. 12 is a flowchart illustrating an example method for encoding a block in accordance with the techniques of this disclosure. The method of FIG. 12 is described with respect to video encoder 20 for purposes of explanation, although it should be understood that other devices may be configured to perform the method of FIG. 12.

Initially, in this example, video encoder 20 receives a current block (250), e.g., a current prediction unit (PU) of a current coding unit (CU). Mode select unit 40 of video encoder 20 may then determine a prediction mode for the current block (252). For example, mode select unit 40 may determine rate-distortion metrics for various prediction modes, such as temporal inter-prediction, inter-view prediction, advanced residual prediction (ARP), and illumination compensation.

If mode select unit 40 selects ARP as the prediction mode for the current block ("YES" branch of 254), video encoder 20 may signal a non-zero ARP weighting factor for the current block (258). For instance, mode select unit 40 may determine whether to use an ARP weighting factor of 0.5 or 1.0, which may again be based on rate-distortion metrics. Notably, in this case, video encoder 20 need not signal an illumination compensation syntax element (e.g., ic_flag), because the prediction mode can be inferred to be ARP and not illumination compensation, due to the ARP weighting factor being non-zero.

Video encoder 20 may then predict the current block using ARP (260). For example, motion compensation unit 44 may determine a reference block using either a temporal motion vector or a disparity motion vector of the current block. Motion estimation unit 42 may calculate the temporal motion vector or the disparity motion vector. Motion compensation unit 44 may further calculate a residual predictor as, e.g., the difference between either a block in a reference view (identified by a disparity vector) or a block in the current view (identified by a temporal motion vector) and a base view reference block (indicated by a combination of a disparity vector or disparity motion vector and a temporal motion vector relative to the position of the current block), as discussed above with respect to FIGS. 9 and 11.

When the prediction mode is not ARP ("NO" branch of 254), and when the prediction mode is illumination compensation ("YES" branch of 256), video encoder 20 may signal a value of 0 for the ARP weighting factor (WF) and a value of true (e.g., one) for an illumination compensation syntax element, such as ic_flag (262). That is, video encoder 20 signals a value for the illumination compensation syntax element that indicates that illumination compensation is used for the current block. Furthermore, video encoder 20 may predict the current block using illumination compensation (264). That is, as explained above with respect to FIG. 8, video encoder 20 may determine a reference block for the current block using a disparity motion vector, and determine values to be used to linearly modify pixels of the reference block based on neighboring pixels to the current block (neighboring pixels 124 in FIG. 8) and neighboring pixels to the reference block (neighboring pixels 130 in FIG. 8).

When the prediction mode is not ARP ("NO" branch of 254), and when the prediction mode is not illumination compensation ("NO" branch of 256), video encoder 20 may signal a value of 0 for the ARP weighting factor (WF) and a value of false (e.g., zero) for an illumination compensation syntax element, such as ic_flag (266). That is, video encoder 20 signals a value for the illumination compensation syntax element that indicates that illumination compensation is not used for the current block. Video encoder 20 may further signal one or more syntax elements that indicate the actual prediction mode (268). Alternatively, the prediction mode may be inferred to be inter-prediction, and the motion parameters signaled for the current block may inherently indicate whether the prediction mode is temporal inter-prediction or inter-view prediction, such that no additional syntax elements need be signaled. Video encoder 20 may further predict the current block using the signaled (or default) prediction mode (270).

After predicting the current block, video encoder 20 may calculate a residual block for the current block (272). Regardless of the mode used to calculate the predicted block, video encoder 20 may calculate the residual block by calculating pixel-by-pixel differences between the current block and the predicted block. Video encoder 20 may then transform, quantize, and entropy encode the residual block (274). More particularly, transform processing unit 52 transforms the residual block, e.g., using a discrete cosine transform (DCT), quantization unit 54 quantizes the resulting transform coefficients, and entropy encoding unit 56 entropy encodes the quantized transform coefficients. Of course, entropy encoding unit 56 may entropy encode other syntax elements as well, e.g., the ARP weighting factor and (if signaled) the illumination compensation syntax element, as well as motion parameters for the current block.

In this manner, the method of FIG. 12 represents an example of a method of encoding video data including determining a value for an advanced residual prediction (ARP) weighting factor of a current block and when the value of the ARP weighting factor is not equal to zero, skipping encoding of an illumination compensation syntax element for the current block and encoding the current block. The example method of FIG. 12 further includes, when the value of the ARP weighting factor is equal to zero, encoding the illumination compensation syntax element for the current block and encoding the current block based at least in part on the value of the illumination compensation syntax element.

Figure 13:
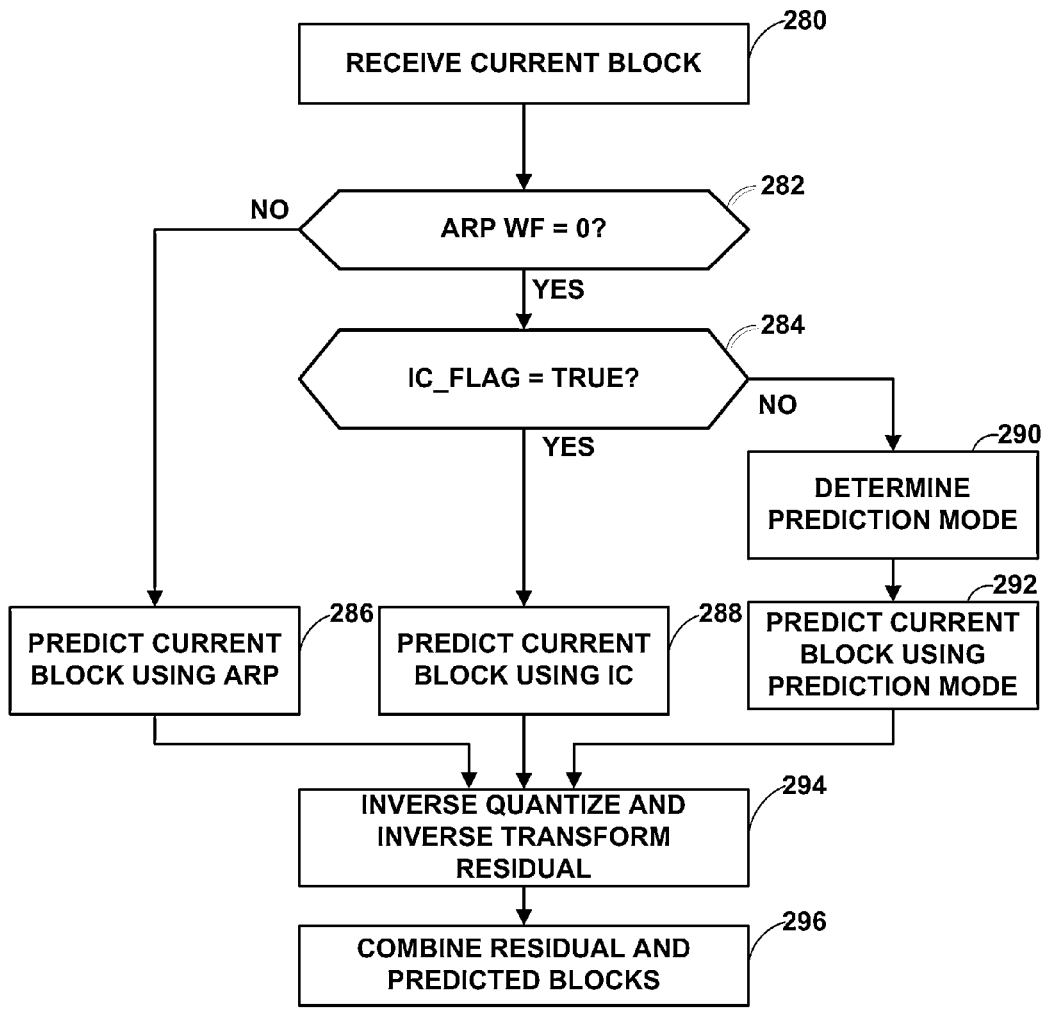
FIG. 13 is a flowchart illustrating an example method for decoding a block in accordance with the techniques of this disclosure.

FIG. 13 is a flowchart illustrating an example method for decoding a block in accordance with the techniques of this disclosure. The method of FIG. 13 is described with respect to video decoder 30 for purposes of explanation, although it should be understood that other devices may be configured to perform the method of FIG. 13.

Initially, video decoder 30 receives a current block (280). More particularly, video decoder 30 receives entropy encoded syntax elements for the current block. Video decoder 30 may decode each syntax element individually. Upon reaching an ARP weighting factor syntax element, video decoder 30 may determine whether the ARP weighting factor has a value of zero for the current block (282).

If the ARP weighting factor has a non-zero value ("NO" branch of 282), video decoder 30 may determine that ARP is used to predict the current block. Thus, entropy decoding unit 70 may skip attempting to decode an illumination compensation syntax element for the current block, based on the implication that this illumination compensation syntax element will not be included in the bitstream. Accordingly, video decoder 30 may predict the current block using ARP (286). For example, as explained above with respect to FIGS. 9 and 11, motion compensation unit 72 may calculate a residual predictor as, e.g., the difference between either a block in a reference view (identified by a disparity vector) or a block in the current view (identified by a temporal motion vector) and a base view reference block (indicated by a combination of a disparity vector or disparity motion vector and a temporal motion vector relative to the position of the current block) and apply the ARP weighting factor to the residual predictor. Motion compensation unit 72 may also calculate a predictor for the current block using either a disparity motion vector or a temporal motion vector, and combine the predictor with the residual predictor (as modified by the ARP weighting factor) to produce a predicted block for the current block.

However, if the ARP weighting factor is equal to zero ("YES" branch of 282), video decoder 30 may determine that an illumination compensation syntax element will be signaled in the bitstream for the current block. Therefore, entropy decoding unit 70 may decode a value for the illumination compensation syntax element (e.g., ic_flag), and video decoder 30 may determine whether the illumination compensation syntax element has a value of true (e.g., 1) or false (e.g., 0) (284), where it is assumed that a value of true or 1 indicates that illumination compensation is used and false or 0 indicates that illumination compensation is not used.

When the illumination compensation syntax element has a value of true ("YES" branch of 284), video decoder 30 may predict the current block using illumination compensation (288). That is, as explained above with respect to FIG. 8, video decoder 30 may determine a reference block for the current block using a disparity motion vector, and determine values to be used to linearly modify pixels of the reference block based on neighboring pixels to the current block (neighboring pixels 124 in FIG. 8) and neighboring pixels to the reference block (neighboring pixels 130 in FIG. 8).

When the illumination compensation syntax element has a value of false ("NO" branch of 284), video decoder 30 may determine an actual prediction mode for the current block (290) and predict the current block using the prediction mode (292). For example, when the current block is an inter-predicted block and the prediction mode is neither ARP nor illumination compensation, video decoder 30 may infer that the prediction mode is inter-prediction, which may be either inter-view prediction or temporal inter-prediction, as indicated by, e.g., motion parameters for the current block. That is, if a reference picture has the same POC value as the current picture, the prediction mode is inter-view prediction, whereas if the reference picture has a different POC value than the current picture, the prediction mode is temporal inter-prediction. Motion compensation unit 72 may use the motion parameters to decode a motion vector (temporal or disparity) for the current block and predict the current block using the motion vector.

Video decoder 30 may then inverse quantize and inverse transform a residual block for the current block (294). That is, inverse quantization unit 76 may inverse quantize entropy decoded data for the residual block to reproduce transform coefficients for the residual block, and inverse transform unit 78 may inverse transform the transform coefficients to reproduce the residual block. Video decoder 30 may then combine the residual block and the predicted block to decode the current block (296). That is, video decoder 30 may perform pixel-by-pixel addition between the residual block and the predicted block to reproduce the current block.

In this manner, the method of FIG. 13 represents an example of a method of decoding video data including determining a value for an advanced residual prediction (ARP) weighting factor of a current block and when the value of the ARP weighting factor is not equal to zero, skipping decoding of an illumination compensation syntax element for the current block and decoding the current block. The method of FIG. 13 further includes, when the value of the ARP weighting factor is equal to zero, decoding the illumination compensation syntax element for the current block and decoding the current block based at least in part on the value of the illumination compensation syntax element.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
determining a value for an advanced residual prediction (ARP) weighting factor of an ARP process, the ARP weighting factor for a current block, wherein the current block is included in a current picture of a current view, wherein the ARP weighting factor comprises a weight value to be applied to pixel-by-pixel differences between a first reference block of a first inter-view reference picture in a reference view and a second reference block of a second inter-view reference picture in the reference view, and wherein the current view is different than the reference view; and in response to determining that the value of the ARP weighting factor is not equal to zero:
skipping coding of an illumination compensation syntax element for the current block; and
coding the current block using the ARP process, wherein coding the current block using the ARP process comprises:
applying the weight value to the pixel-by-pixel differences between the first reference block and the second reference block to produce weighted pixel differences; and
predicting the current block using the weighted pixel differences.

2. The method of claim 1, further comprising, in response to determining that the value of the ARP weighting factor is equal to zero, coding the illumination compensation syntax element for the current block and coding the current block based at least in part on the value of the illumination compensation syntax element.

3. The method of claim 2, wherein the illumination compensation syntax element comprises an ic_flag syntax element.

4. The method of claim 2, wherein coding the illumination compensation syntax element comprises determining whether illumination compensation is enabled for the current block and coding the illumination compensation syntax element only when illumination compensation is enabled for the current block.

5. The method of claim 2, further comprising coding a slice level illumination compensation syntax element that indicates whether illumination compensation is enabled for a slice including the current block, wherein coding the illumination compensation syntax element for the current block comprises coding the illumination compensation syntax element for the current block only when the slice level illumination compensation syntax element indicates that illumination compensation is enabled for the slice.

6. The method of claim 5, wherein the slice level illumination compensation syntax element comprises a slice_ic_enable_flag.

7. The method of claim 2, wherein coding the illumination compensation syntax element comprises coding the illumination compensation syntax element if and only if the ARP weighting factor has a value equal to zero and at least one of (a) or (b) is true, where (a) is that the current block is coded with merge mode and at least one of (i) or (ii), where (i) is that a syntax element in a slice header for a slice including the current block has a value indicating that illumination compensation mode is enabled for the current slice, where (ii) is that a merge index for the current block has a non-zero value, and where (b) is that the current block is coded with advanced motion vector prediction (AMVP) mode and at least one reference index for the current block corresponds to an inter-view reference picture comprising one of the first inter-view reference picture or the second inter-view reference picture.

8. The method of claim 7, wherein the syntax element in the slice header for the slice comprises slice_ic_disable_merge_zero_idx_flag.

9. The method of claim 2, wherein coding the illumination compensation syntax element comprises coding the illumination compensation syntax element when a current picture including the current block is an intra random access picture (IRAP).

10. The method of claim 2, further comprising coding at least one syntax element indicating whether illumination compensation is used for at least one layer of multi-layer video data.

11. The method of claim 2, wherein coding the current block based at least in part on the value of the illumination compensation syntax element comprises coding the current block using illumination compensation when the value of the illumination compensation syntax element indicates that the current block is to be coded using illumination compensation.

12. The method of claim 2, wherein when the value of the ARP weighting factor is equal to zero, coding the current block based at least in part on the value of the illumination compensation syntax element comprises coding the current block without using illumination compensation when the value of the illumination compensation syntax element indicates that the current block is not to be coded using illumination compensation and without using ARP.

13. The method of claim 1, further comprising, prior to determining the value of the ARP weighting factor:
determining whether ARP is enabled for a slice including the current block; and
determining whether the current block is inter-coded,
wherein determining the value of the ARP weighting factor comprises determining the value of the ARP weighting factor when ARP is enabled and when the current block is inter-coded.

14. The method of claim 1, wherein skipping coding of the illumination compensation syntax element comprises skipping decoding of the illumination compensation syntax element, and wherein coding the current block comprises decoding the current block.

15. The method of claim 1, wherein skipping coding of the illumination compensation syntax element comprises skipping signaling of the illumination compensation syntax element, and wherein coding the current block comprises encoding the current block.

16. A device for coding video data, the device comprising:
a memory configured to store video data; and
a video coder implemented in circuitry and configured to:
determine a value for an advanced residual prediction (ARP) weighting factor of an ARP process, the ARP weighting factor for a current block of the video data, wherein the current block is included in a current picture of a current view, wherein the ARP weighting factor comprises a weight value to be applied to pixel-by-pixel differences between a first reference block of a first inter-view reference picture in a reference view and a second reference block of a second inter-view reference picture in the reference view, and wherein the current view is different than the reference view;
skip coding of an illumination compensation syntax element for the current block when the value of the ARP weighting factor is not equal to zero; and
code the current block using the ARP process when the value of the ARP weighting factor is not equal to zero, wherein to code the current block using the ARP process, the video coder is configured to:
apply the weight value to the pixel-by-pixel differences between the first reference block and the second reference block to produce weighted pixel differences; and
predict the current block using the weighted pixel differences.

17. The device of claim 16, wherein the video coder is further configured to code the illumination compensation syntax element for the current block and code the current block based at least in part on the value of the illumination compensation syntax element when the value of the ARP weighting factor is equal to zero.

18. The device of claim 17, wherein the illumination compensation syntax element comprises an ic_flag syntax element.

19. The device of claim 17, wherein the video coder is configured to determine whether illumination compensation is enabled for the current block and to code the illumination compensation syntax element only when illumination compensation is enabled for the current block.

20. The device of claim 17, wherein the video coder is further configured to code a slice level illumination compensation syntax element that indicates whether illumination compensation is enabled for a slice including the current block, and wherein the video coder is configured to code the illumination compensation syntax element for the current block only when the slice level illumination compensation syntax element indicates that illumination compensation is enabled for the slice.

21. The device of claim 20, wherein the slice level illumination compensation syntax element comprises a slice_ic_enable_flag.

22. The device of claim 16, wherein the video coder is further configured to, prior to determining the value of the ARP weighting factor, determine whether ARP is enabled for a slice including the current block and determine whether the current block is inter-coded, wherein the video coder is configured to determine the value of the ARP weighting factor when ARP is enabled and when the current block is inter-coded.

23. A device for coding video data, the device comprising:
means for determining a value for an advanced residual prediction (ARP) weighting factor of an ARP process, the ARP weighting factor for a current block, wherein the current block is included in a current picture of a current view, wherein the ARP weighting factor comprises a weight value to be applied to pixel-by-pixel differences between a first reference block of a first inter-view reference picture in a reference view and a second reference block of a second inter-view reference picture in the reference view, and wherein the current view is different than the reference view;
means for skipping coding of an illumination compensation syntax element for the current block when the value of the ARP weighting factor is not equal to zero; and
means for coding the current block using the ARP process when the value of the ARP weighting factor is not equal to zero, wherein the means for coding the current block using the ARP process comprises:
means for applying the weight value to the pixel-by-pixel differences between the first reference block and the second reference block to produce weighted pixel differences; and
means for predicting the current block using the weighted pixel differences.

24. A non-transitory computer-readable storage medium having stored thereon instructions that, when executed, cause a processor of a device for coding video data to:
determine a value for an advanced residual prediction (ARP) weighting factor of an ARP process, the ARP weighting factor for a current block, wherein the current block is included in a current picture of a current view, wherein the ARP weighting factor comprises a weight value to be applied to pixel-by-pixel differences between a first reference block of a first inter-view reference picture in a reference view and a second reference block of a second inter-view reference picture in the reference view, and wherein the current view is different than the reference view; and
when the value of the ARP weighting factor is not equal to zero, skip coding of an illumination compensation syntax element for the current block and code the current block using the ARP process, wherein the instructions that cause the processor to code the current block using the ARP process comprise instructions that cause the processor to:
apply the weight value to the pixel-by-pixel differences between the first reference block and the second reference block to produce weighted pixel differences; and
predict the current block using the weighted pixel differences.

25. The non-transitory computer-readable storage medium of claim 24, further comprising instructions that cause the processor to, when the value of the ARP weighting factor is equal to zero, code the illumination compensation syntax element for the current block and code the current block based at least in part on the value of the illumination compensation syntax element.

26. The non-transitory computer-readable storage medium of claim 25, wherein the illumination compensation syntax element comprises an ic_flag syntax element.

27. The non-transitory computer-readable storage medium of claim 25, wherein the instructions that cause the processor to code the illumination compensation syntax element comprise instructions that cause the processor determine whether illumination compensation is enabled for the current block and to code the illumination compensation syntax element only when illumination compensation is enabled for the current block.

28. The non-transitory computer-readable storage medium of claim 25, further comprising instructions that cause the processor to code a slice level illumination compensation syntax element that indicates whether illumination compensation is enabled for a slice including the current block, wherein the instructions that cause the processor to code the illumination compensation syntax element for the current block comprise instructions that cause the processor to code the illumination compensation syntax element for the current block only when the slice level illumination compensation syntax element indicates that illumination compensation is enabled for the slice.

29. The non-transitory computer-readable storage medium of claim 24, further comprising instructions that cause the processor to, prior to determining the value of the ARP weighting factor:
determine whether ARP is enabled for a slice including the current block; and
determine whether the current block is inter-coded,
wherein the instructions that cause the processor to determine the value of the ARP weighting factor comprise instructions that cause the processor to determine the value of the ARP weighting factor when ARP is enabled and when the current block is inter-coded.

* * * * *